United States Patent
Cui et al.

(10) Patent No.: US 8,935,677 B2
(45) Date of Patent: Jan. 13, 2015

(54) AUTOMATIC REVERSE ENGINEERING OF INPUT FORMATS

(75) Inventors: Weidong Cui, Redmond, WA (US); Marcus Peinado, Bellevue, WA (US); Karl Chen, San Jose, CA (US); Jiahe Helen Wang, Issaquah, WA (US); Luis Irun-Briz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1426 days.

(21) Appl. No.: 12/098,496

(22) Filed: Apr. 7, 2008

(65) Prior Publication Data

US 2009/0254891 A1    Oct. 8, 2009

(51) Int. Cl.
*G06F 9/44* (2006.01)
*G06F 9/45* (2006.01)

(52) U.S. Cl.
CPC .......................... *G06F 8/53* (2013.01)
USPC ........................................... 717/138

(58) Field of Classification Search
CPC .................................. H04L 12/2697
USPC ....................................... 717/138
See application file for complete search history.

(56) References Cited

U.S. PATENT DOCUMENTS

| | | | |
|---|---|---|---|
| 6,952,425 B1 * | 10/2005 | Nelson | 370/429 |
| 7,107,492 B2 | 9/2006 | Dassow et al. | |
| 7,225,188 B1 * | 5/2007 | Gai et al. | 1/1 |
| 7,802,009 B2 * | 9/2010 | Cui et al. | 709/236 |
| 7,962,904 B2 * | 6/2011 | Zabokritski | 717/143 |
| 2004/0120311 A1 * | 6/2004 | Marsot et al. | 370/352 |
| 2005/0134308 A1 * | 6/2005 | Okada et al. | 326/39 |
| 2006/0095968 A1 * | 5/2006 | Portolani et al. | 726/23 |
| 2006/0200711 A1 * | 9/2006 | Schondelmayer et al. | 714/712 |
| 2007/0074080 A1 * | 3/2007 | FitzGerald | 714/45 |
| 2007/0112969 A1 * | 5/2007 | Wang et al. | 709/230 |
| 2007/0226483 A1 * | 9/2007 | Cox et al. | 713/151 |
| 2007/0250930 A1 * | 10/2007 | Aziz et al. | 726/24 |
| 2009/0150873 A1 * | 6/2009 | Taneda | 717/148 |
| 2009/0254891 A1 * | 10/2009 | Cui et al. | 717/138 |

FOREIGN PATENT DOCUMENTS

| WO | WO2006020289A2 A2 | 2/2006 |
|---|---|---|
| WO | WO2007110093A1 A1 | 10/2007 |

OTHER PUBLICATIONS

Vogt et al., Cross-Site Scripting Prevention with Dynamic Data Tainting and Static Analysis, (Feb. 2007).*
Vogt et al., Cross-Site Scripting Prevention with Dynamic Data Tainting and Static Analysis (2007) retrieved from http://citeseerx.istpsu.edu/viewdoc/summary?doi=10.1.1.117.6526 on Apr. 6, 2013.*
Vogt et al., Cross-Site Scripting Prevention with Dynamic Data Tainting and Static Analysis (2007) retrieved from http://citeseerx.ist.psu.edu/viewdoc/summary?doi=10.1.1.117.6526 on Apr. 6, 2013.*

(Continued)

*Primary Examiner* — Don Wong
*Assistant Examiner* — Theodore Hebert
(74) *Attorney, Agent, or Firm* — Steve Wight; Judy Yee; Micky Minhas

(57) ABSTRACT

Systems and methods for automatically reverse engineering an input data format using dynamic data flow analysis. Combining input data with a simulated execution of the binary program using the input data and analyzing the use of the data by the program to generate a BNL-like grammar representing the input data format. The input data can be application level protocols, network protocols or formatted files.

20 Claims, 19 Drawing Sheets

(56) References Cited

OTHER PUBLICATIONS

Caballero et al., Polyglot: Automatic Extraction of Protocol Message Format using Dynamic Binary Analysis, (Oct. 29, 2007).*
Vogt et al., Cross-Site Scripting Prevention with Dynamic Data Tainting and Static Analysis (2007).*
Morgan, R.; "Building an Optimizing Compiler"; Butterworth-Heinemann, 1998; pp. 80-93.
Beddoe, M.;"The Protocol Informatics Project"; 2004; 44 pages.
Bhansali, et al., "Framework for Instruction-level Tracing and Analysis of Program Executions", Retrieved at <<http://static.usenix.org/events/vee06/full_papers/p154-bhansali.pdf>>, In Proceedings of the 2nd International Conference on Virtual Execution Environments, Jun. 14, 2006, pp. 10.
Borisov, et al., "A Generic Application-Level Protocol Analyzer and its Language", Retrieved at <<http://www.eecs.berkeley.edu/~pallavi/papers/GAPA.pdf>>, In Proceedings of the 14th Annual Network & Distributed System Security Symposium, Mar. 2007, pp. 13.
Christodorescu, et al., "String Analysis for x86 Binaries", Retrieved at <<http://pages.cs.wisc.edu/~mihai/publications/String%20Analysis%20for%20x86%20Binaries/String%20Analysis%20for%20 x86%20Binaries.pdf>>, In Proceedings of the 6th ACM SIGPLAN-SIGSOFT Workshop on Program Analysis for Software Tools and Engineering, Sep. 5, 2005, pp. 8.
Costa, et al., "Vigilante: End-to-End Containment of Internet Worms", Retrieved at <<http://www.csd.uoc.gr/~hy558/papers/vigilante.pdf>>, In Proceedings of the Twentieth ACM Symposium on Operating Systems Principles, Oct. 23, 2005, pp. 15.
Crandall, et al., "Minos: Control Data Attack Prevention Orthogonal to Memory Model", Retrieved at <<http://www.cs.ucr.edu/~gupta/teaching/620-06/Papers/221.pdf>>, In Proceedings of the 37th International Symposium on Microarchitecture, Dec. 4, 2004, pp. 12.
Cui, et al., "Discoverer: Automatic Protocol Reverse Engineering from Network Traces", Retrieved at <<http://static.usenix.org/event/sec07/tech/full_papers/cui/cui.pdf>>, In Proceedings of 16th USENIX Security Symposium on USENIX Security Symposium, Aug. 6, 2007, pp. 14.
Cui, et al., "Protocol-Independent Adaptive Replay of Application Dialog", Retrieved at <<http://www.icsi.berkeley.edu/pubs/networking/CPWK06.pdf>>, In Proceedings of the 13th Symposium on Network and Distributed System Security, Feb. 2, 2006, pp. 15.
Cui, et al., "ShieldGen: Automatd Data Patch Generatoin for Unknown Vulnerabilities with Informed Probing", Retrieved at <<http://ieeexplore.ieee.org/stamp/stamp.jsp?tp=&arnumber=4223230>>, In Proceedings of the IEEE Symposium on Security and Privacy, May 20, 2007, pp. 15.
Cui, W. et al.; "Tupni: Automatic Reverse Engineering of Input Formats"; Proceedings of the 15th ACM Conference on Computer and Communications Security; 2008; ACM, New York, NY; pp. 391-402.
Dreger, et al., "Dynamic Application-Layer Protocol Analysis for Network Intrusion Detection", Retrieved at <<http://static.usenix.org/event/sec06/tech/full_papers/dreger/dreger.pdf>>, In Proceedings of the 15th USENIX Security Symposium, Aug. 4, 2006, pp. 16.
Ernst, et al., "The Daikon System for Dynamic Detection of Likely Invariants", In Science of Computer Programming, vol. 69, No. 1-3, Oct. 11, 2007, pp. 11.
"Gaim Instant Messaging Client", Retrieved at <<http://www.pidgin.im/>>, Aug. 30, 2012.
Kannan, J. et al., "Semi-Automated Discovery of Application Session Structure", Retrieved at <<http://nms.lcs.mit.edu/papers/p12-kannan.pdf>>, In Proceedings of the 6th ACM SIGCOMM Conference on Internet Measurement, Oct. 25, 2006, pp. 13.
Landgren, David., "Regexp::Assemble Perl Module", Retrieved at <<http://search.cpan.org/dist/Regexp-Assemble/>>, Apr. 7, 2011.
Leita, C. et al., "Automatic Handling of Protocol Dependencies and Reaction to 0-Day Attacks with ScriptGen based Honeypots", Retrieved at <<http://www.rennes.supelec.fr/aces/PUBLIS/paper-raid06.pdf>>, In Proceedings of the 9th International Symposium on Recent Advances in Intrusion Detection, Sep. 20, 2006, pp. 21.
Leita, C. et al., "ScriptGen: An Automated Script Generation Tool for Honeyd", Retrieved at <<http://www.acsac.org/2005/papers/118.pdf>>, In Proceedings of the 21st Annual Computer Security Applications Conference, Dec. 5, 2005, pp. 12.
Lim, et al., "Extracting Output Formats from Executables", Retrieved at <<http://research.cs.wisc.edu/wpis/papers/wcre06.pdf>>, In Proceedings of the 13th Working Conference on Reverse Engineering, Oct. 23, 2006, pp. 10.
Newsome, et al., "Vulnerability-Specific Execution Filtering for Exploit Prevention on Commodity Software", Retrieved at <<http://www.cs.berkeley.edu/~dawnsong/papers/vsef.pdf>>, In Proceedings of the 13th Annual Network and Distributed Systems Security Symposium, Feb. 2006, pp. 14.
Newsome, et al., "Dynamic Taint Analysis for Automatic Detection, Analysis, and Signature Generation of Exploits on Commodity Software", Retrieved at <<http://valgrind.org/docs/newsome2005.pdf>>, In Proceedings of the 12th Symposium on Network and Distributed System Security, Feb. 2005, pp. 17.
Oehlert, Peter., "Violating Assumptions with Fuzzing", Retrieved at <<http://ieeexplore.ieee.org/stamp/stamp.jsp?tp=&arnumber=1423963>>, In IEEE Security and Privacy Magazine, vol. 3, Issue 2, Mar. 2005, pp. 5.
Pang, et al., "binpac: A yacc for Writing Application Protocol Parsers", Retrieved at <<http://www.icir.org/vern/papers/binpac.IMC06.pdf>>, In Proceedings of the 6th ACM SIGCOMM Conference on Internet Measurement, Oct. 25, 2006, pp. 12.
Tridgell, Andrew., "How Samba Was Written", Retrieved at <<http://www.samba.org/ftp/tridge/misc/french_cafe.txt>>, Aug. 2003.
Suh, et al., "Secure Program Execution via Dynamic Information Flow Tracking", Retrieved at <<http://www.bitsavers.org/pdf/mit/lcs/tr/MIT-LCS-TR-912.pdf>>, In Proceedings of the 11th International Conference on Architectural Support for Programming Languages and Operating Systems, Oct. 7, 2004, pp. 12.
Vogt, et al., "Cross-Site Scripting Prevention with Dynamic Data Tainting and Static Analysis.", Retrieved at <<http://publik.tuwien.ac.at/files/pub-inf_5310.pdf>>, In Proceeding of the Network and Distributed System Security Symposium, Feb. 2007, pp. 12.
"Wireshark: A Network Protocol Analyzer", Retrieved at <<http://wireshark.com/>>, Aug. 30, 2012.
Mutz, D. et al.; "Reverse Engineering of Network Signatures"; Proceedings of the Auscert Asia Pacific Information Technology Security Conference, Gold; 2005; 12 pages.

* cited by examiner

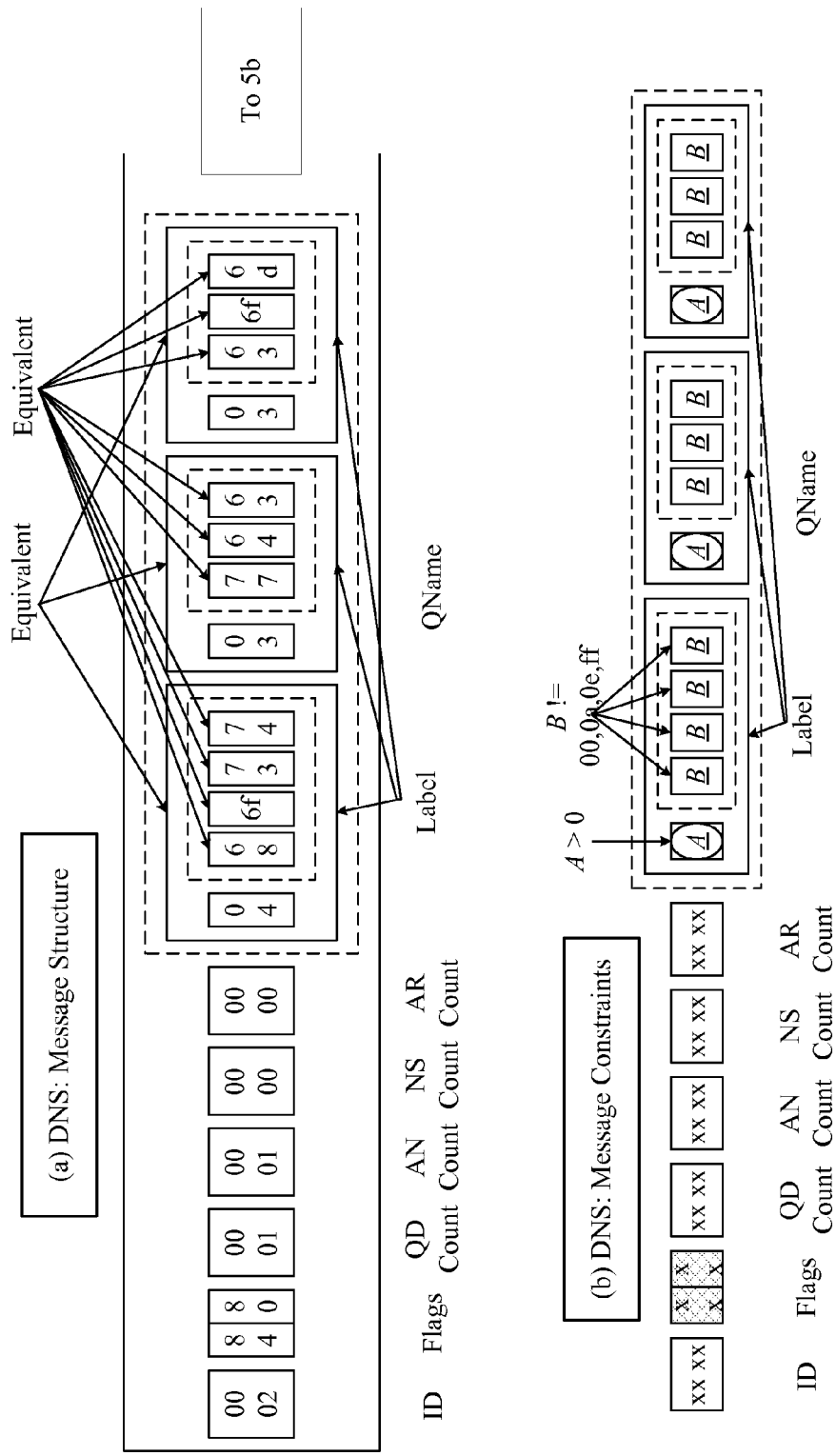

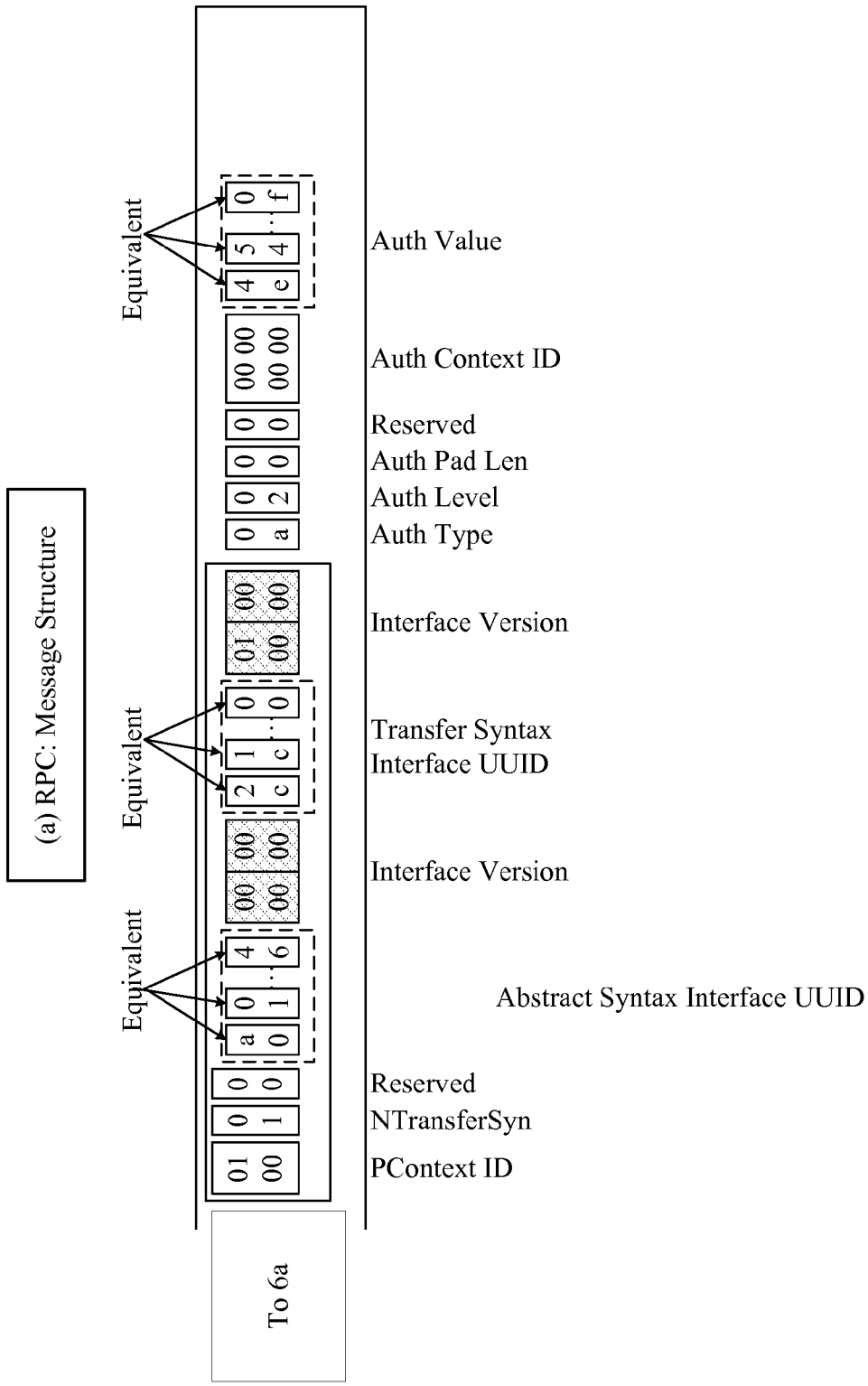

(b) FTP: Message Structure (a) FTP: Message Structure

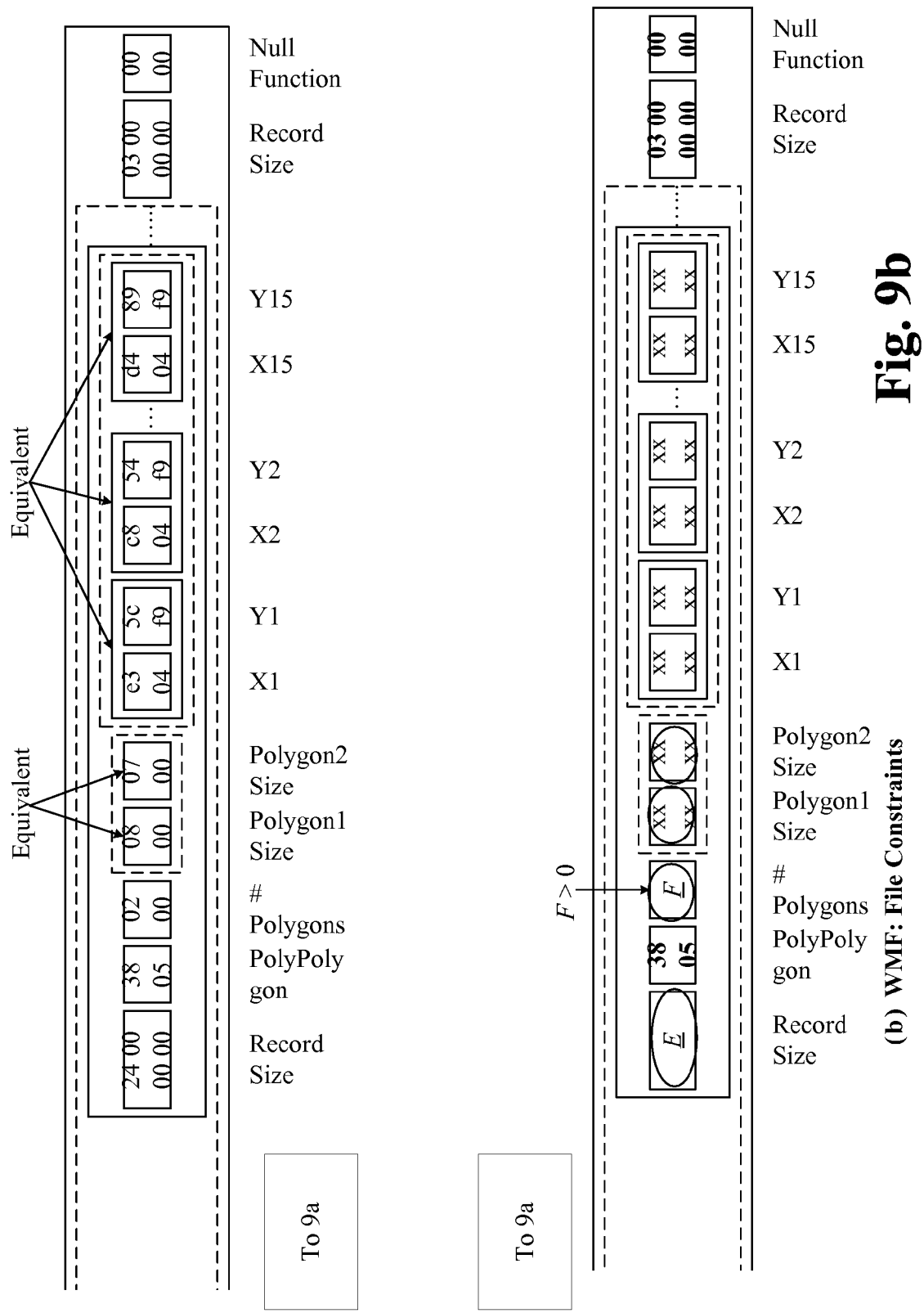

AUTOMATIC REVERSE ENGINEERING OF INPUT FORMATS

BACKGROUND

The importance of the ability to automatically reverse engineer application-level protocols and file format specifications has increased recently because of the growth in concern for network and system security. The availability of such application-level protocol and file format specifications information provides security applications such as firewalls or intrusion detection systems the context information of a network communication or file parsing session, which is important for accurately detecting or preventing intrusions. The ability to automatically reverse engineer application-level protocols and file format specifications alleviates the time-consuming and error-prone manual reverse engineering operation and provides tools to effectively combat contemporary security threats.

Most of the current efforts in reverse engineering of input formats of application-level protocols and file format specifications involve a manual operation. The time involved in accomplishing this task can sometimes be measured in years and this effort may prove unfeasible if the application-level protocol or file format changes faster than engineers can complete the reverse engineering. Existing technology that attempts to automatically reverse engineer application-level protocols and file format specifications also falls short of current market demands. Current tools for automatically reverse engineering protocols are limited to network protocols utilizing a network trace and are limited by the information available in the network trace. Consequently, binary fields and repetitive elements are difficult to identify.

The increase in interest in network and system security combined with a greater sophistication in application-level protocols and file specification formats has created a market demand for a system capable of automatically reverse engineering application-level protocols and file format specifications for areas other than network protocols. In addition to the security uses reference above, the results obtained from the reverse engineering is also valuable for network management applications and Generic Protocol Analyzers.

SUMMARY

The following presents a simplified summary in order to provide a basic understanding and high-level survey. This summary is not an extensive overview. It is neither intended to identify key or critical elements nor to delineate scope. The sole purpose of this summary is to present some concepts in a simplified form as a prelude to the more detailed description later presented. Additionally, section headings used herein are provided merely for convenience and should not be taken as limiting in any way.

The subject innovation is a tool for automatically reverse engineering an application-level protocol or a file specification format while providing rich information including the identification of binary fields and repetitive elements. The innovation includes dynamic data flow analysis based on observing how network or file input is parsed and consumed by a program. The novel concepts provided by the subject innovation first include automatically reverse engineering a grammar based on a Backus-Naur Form (BNF)-like rule base supporting alternation and repetition. The grammar output allows more accurate covering of input formats and lends itself more easily to use by generic protocol analyzers. Next, in addition to identifying field boundaries, the subject innovation also infers input constraints. Input constraints are necessary for use in applications that generate and validate input. Next, the analysis includes reconciliation over a large number of input samples. The large sample base increases coverage and drives the reverse engineering output to a more complete representation. Next, the intra-message constraints described above are expanded to infer inter-message constraints. Inter-message constraints provide for the accurate reverse engineering of protocols involving a sequence of messages. Finally, in addition to observing the programs use of the input data, the subject innovation also observes the use of the input data in system and library calls.

In one exemplary non-limiting embodiment, a method of automatically reverse engineering an input format includes observing a programs execution on a machine language level, and automatically determining if the input format is four-byte or two-byte addressing. A computing system includes in one exemplary non-limiting embodiment, a memory and a processor coupled to the memory, the processor is configured to automatically identify boundaries of records in a record sequence. In another exemplary non-limiting embodiment, the system includes means for observing a programs execution on a machine language level, and means for automatically identifying a record sequence of a plurality of records.

Significant advances have been made in using dynamic data flow analysis for automatic reverse engineering. One exemplary non-limiting algorithm embodiment has the new capabilities to infer record sequences in an input format, such as an array of data items. The exemplary non-limiting algorithm embodiment can detect such sequences even if they are nested (record sequences whose records may contain other record sequences). The exemplary non-limiting algorithm embodiment can classify records in such sequences according to their types. The exemplary non-limiting algorithm embodiment can derive constraints of various types that express dependencies across fields or messages, such as checksum fields or sequence number fields. These additional and enhanced capabilities produce more accurate input format specifications with a richer set of structural relationships like nested structures, unions, and arrays as well as constraints among the fields or across messages.

The disclosed and described components and methods comprise one or more of the features hereinafter described and particularly pointed out in the claims. The following description and the annexed drawings set forth in detail certain specific illustrative components and methods. However, these components and methods are indicative of only a few of the various ways in which the disclosed components and methods can be employed. Specific implementations of the disclosed and described components and methods can include some, many, or all of such components and methods, as well as their equivalents. Variations of the specific implementations and examples presented herein will become apparent from the following detailed description when considered in conjunction with the drawings.

DETAILED DESCRIPTION

Figure 1:
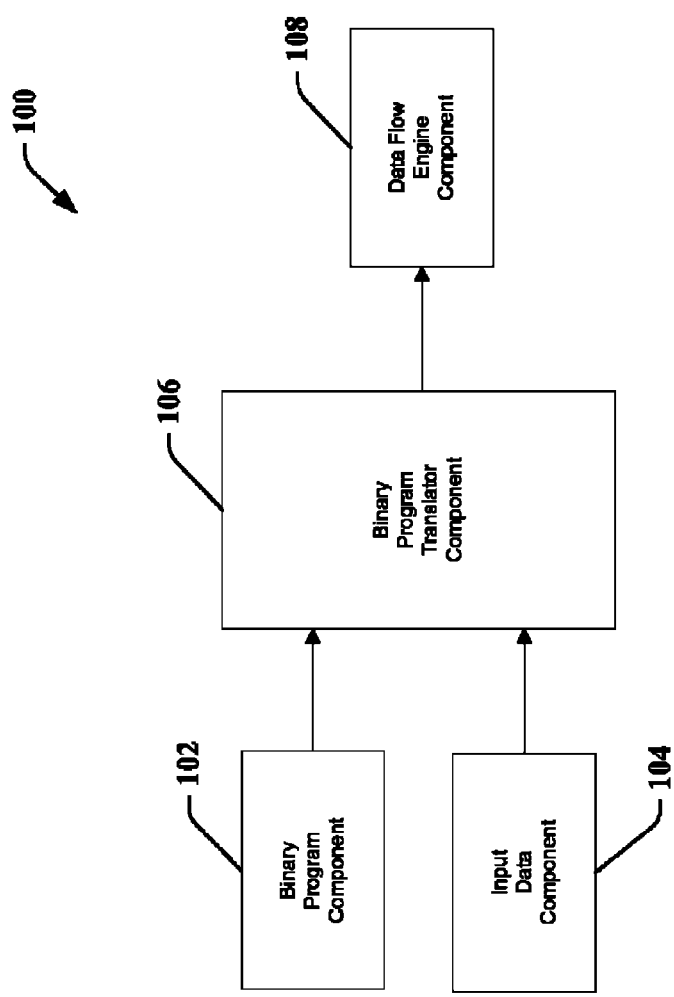
FIG. 1 illustrates a system for automatic reverse engineering of input formats using dynamic data flow analysis

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

The disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description.

Although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

It should also be appreciated that although specific examples presented may describe or depict systems or methods that are based upon components of personal computers, the use of components and methods disclosed and described herein is not limited to that domain. For example, the disclosed and described components and methods can be used in a distributed or network computing environment. Additionally or alternatively, the disclosed and described components and methods can be used on a single server accessed by multiple clients. Those of ordinary skill in the art will readily recognize that the disclosed and described components and methods can be used to create other components and execute other methods on a wide variety of computing devices.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Dynamic data flow analysis has been used for many security issues including exploit detection, patch generation, worm containment, and others. As described herein, significant advances have been made in using dynamic data flow analysis for automatic reverse engineering. One exemplary non-limiting algorithm embodiment can infer record sequences in an input format, such as an array of data items. The inference can make use of artificial intelligence and can detect record sequences even if they are nested (record sequences whose records may contain other record sequences). The exemplary non-limiting algorithm embodiment can classify records in such sequences according to their types. The exemplary non-limiting algorithm embodiment can derive constraints of various types that express dependencies across fields or messages, such as checksum fields or sequence number fields. These additional and enhanced capabilities produce more accurate input format specifications with a richer set of structural relationships like nested structures, unions, and arrays as well as constraints among the fields or across messages.

Most application-level protocols involve the concept of an application session, consisting of a series of messages exchanged between two hosts for the purpose of accomplishing a specific task. Associated with this concept are two essential components in an application-level protocol specification, a protocol state machine and a message format. The protocol state machine characterizes all possible legitimate sequences of messages, while the message format specifies all possible legitimate messages. Files are different from protocols in the sense that each file is a single "message" and therefore there is no "session" concept in a file specification.

Referring initially to FIG. 1, a reverse engineering system 100 for automatically reverse engineering input formats using dynamic data flow analysis is depicted. It should be appreciated that the ever increasing threats to system and network security combined with the increase in complexity of network and application-level protocols and file format specifications have created a market demand for a system level tool capable of automatically reverse engineering network and application-level protocols and file format specifications. Counter to conventional practice in the protocol and file format reverse engineering domain, innovations described herein provide for the generation of a rich BNF-like grammar supporting alternation and repetition.

It is contemplated that the reverse engineering system 100 can form at least part of a network and system security system but is not limited thereto. For example, the HTTP protocol input to a web server on a corporate network can be analyzed to determine if someone is attempting to penetrate the network through a currently unknown vulnerability. Reverse engineering system 100 comprises binary program component 102, input data component 104, binary program translator component 106 and data flow engine component 108.

The binary program component 102 provides for the selection of the binary program used to analyze the application-level protocol or file format input data. One of the novel features of this innovation is the use of a binary program in the analysis to identify the types and numbers of accesses to different locations of the input data. For example, the size of a data field can be determined by a combination of how many times the first byte of the data field is accessed by particular processor instructions known to access data of a certain size.

The input data component 104 provides, in a similar fashion as the binary program component 102, for the selection of a file, stored either locally or remotely, or an application-level or network protocol for use as the input data for a reverse engineering analysis. For example, the user might select a Windows Metafile (WMF) containing an arbitrary sequence of records mapping graphic display functions (GDI) corresponding to a specific graphic image with the result of the analysis being the determination of the format of the file producing the graphic image.

The binary program translator component 106 provides for the replaying of traces from the binary program. The ability to replay traces provides the framework for the novel analysis abilities of identifying fields and repetitive elements. The binary program translator 106 merges the input data from the input data component 104 with the trace of the binary program from the binary program component 102 to provide a reproducible simulated execution of the binary program allowing repetitive analysis by the data flow engine component 108. For example, a trace of a file transfer protocol (FTP) program can be provided to the binary program translator component 106 by the binary program component 102 while the FTP program connects to an FTP server to download files of various sizes and formats.

The data flow engine component 108 provides for the analysis of the input data in the context of the running binary program as simulated by replaying the binary program trace in the binary program translator component 106. For example, the data flow engine component 108 can analyze the trace of a domain name server (DNS) binary program while the binary program does lookups on various hostnames. The data flow engine component 108 can then automatically reverse engineer the data necessary to generate a BNF-like grammar representing the format of the DNS responses.

Figure 2:
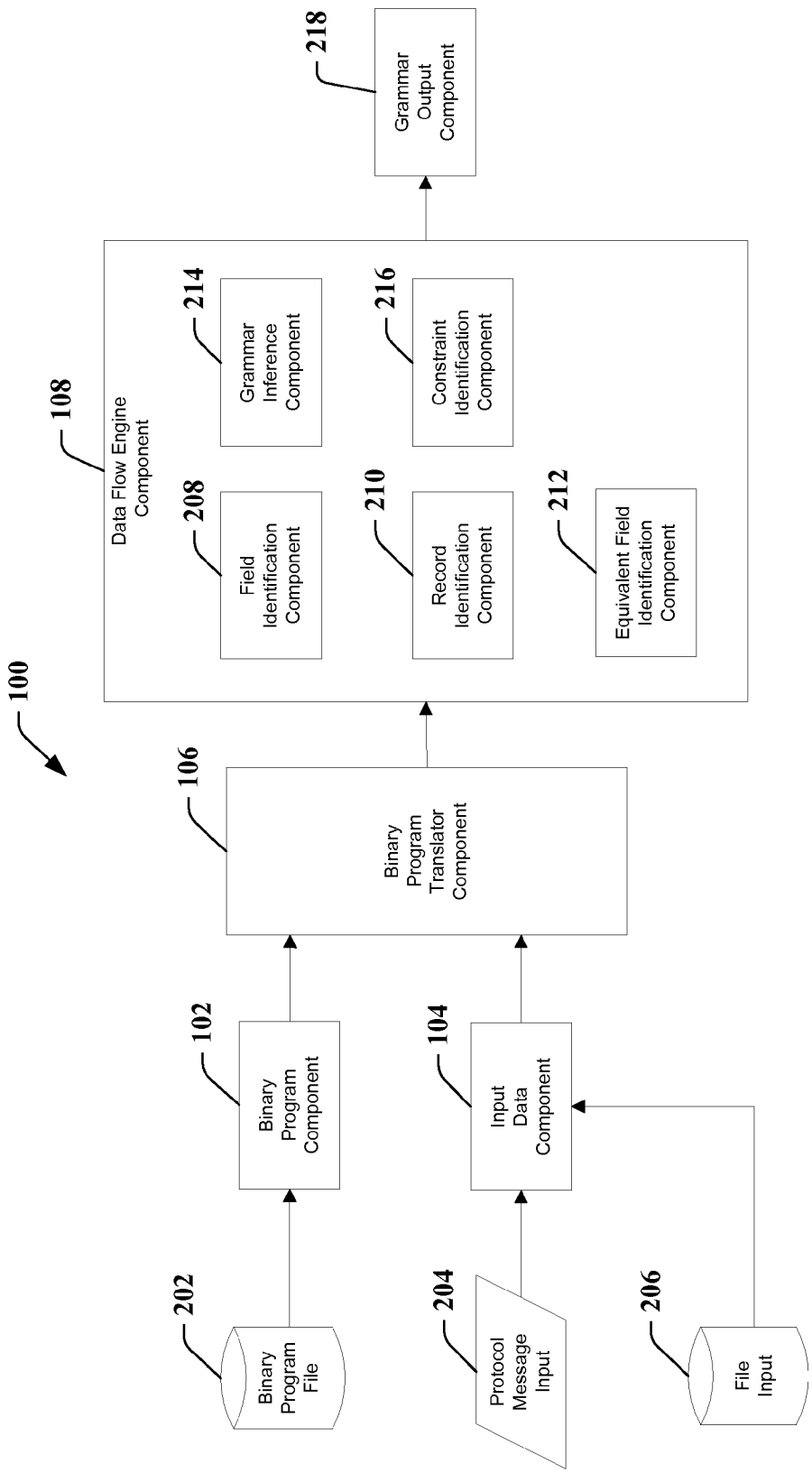
FIG. 2 illustrates an embodiment of an automatic reverse engineering system where binary program files and input data are provided for parsing and analysis by data flow engine components to produce grammar output.

Referring to FIG. 2, a reverse engineering system 100 for automatically reverse engineering input formats using dynamic data flow analysis is depicted and further comprises the binary program file 202 repository, and the protocol message input 204 and file input 206 input data types. In another aspect of the reverse engineering system 100 represented in FIG. 2, the data flow engine component 108 comprises the field identification component 208, the record identification component 210, the equivalent field identification component 212, the grammar inference component 214, and the constraint identification component 216. In another aspect of the reverse engineering system 100 represented in FIG. 2, the grammar output component 218 provides the BNF-like grammar representing the associated file format specification or the network or application-level protocol.

The binary program file 202 is the binary image of the program used in the analysis of the input data as provided to the binary program component 102. The novel feature of using the binary program associated with the input data allows the subject invention to repetitively analyze either the same or different input data to create a more accurate and complete representation of the input data. For example, a binary program that reads its initial configuration from a file of an unknown format can be selected and analyzed while it reads the input data from the configuration file. The analysis can be repeated with the configuration changed between each analysis and after multiple runs of the subject invention, a BNF-like grammar is produced representing the file format specification of the configuration file.

The protocol message input 204 and the file input 206 are the input data to the input data component 104. In the case of the protocol message input 204, this can be but is not limited to HTTP messages sent to a web server or data messages sent to a file transfer protocol program. In the case of the file input 206 this can be any file associated with a binary program where the binary program reads from or writes to the file.

The field identification component 208 maps each position in the input data to a base type in the grammar. The mapping is created by observing how the input data is accessed when the trace from the binary program file 202 is run by the binary program translator component 106. For example, if two consecutive byte locations in the input data are processed as a two-byte word throughout the simulation then the subject invention will identify the two consecutive byte locations as a word data value.

In another aspect of the field identification component 208, the subject invention can resolve conflicts between consecutive bytes of data accessed by different operand types. For example, the binary program trace simulation can access a four consecutive byte location of input data as a single 32-bit value or two 16-bit values or four 8-bit values. The field identification component 208 resolves this conflict by the use of a novel scoring algorithm. The scoring algorithm maintains a score of access of a given section by each operand type and calculates and adjusted score for each operand type accessing a particular section at the completion of the simulated run. An adjusted score is calculated for each operand type by subtracting the unadjusted score of each conflicting operand type form the unadjusted score of the subject operand type. At the end of the analysis, the operand with the highest adjusted score is considered the most valid operand and the size of the subject data field in the input data is set to the size of the data accessed by the most valid operand. In a similar fashion, field identification component 208 can recognize byte ordering such as big-endian integers by recognizing access of bytes in reverse order. The input data is tracked at byte level granularity.

In another aspect of the field identification component 208, different score values are assigned to different instructions based on the type of instruction. The subject invention divides all instructions into four levels with each level having a different score value. The first level has the highest score value and comprises comparison instructions showing an input value equal to some value. The second level has a score value less than the first level and greater than the third level and comprises input values treated as arguments to function call instructions. The third level has a score value less than the second level and greater than the fourth level and comprises all other comparison instructions in addition to all arithmetic and logic instructions. The fourth level has a score value less than the third level and comprises all memory move type instructions.

Field identification component 208 discloses another novel aspect of identifying sequences of bytes of input data from contiguous offsets, known as chunks, and associating these identified chunks with identified fields. The disclosure accomplishes this association by finding a subset of chunks selected to maximize the sum of the weights of the chunks. The invention uses the Greedy algorithm for weighted set-packing to compute the best subset from application traces of input data. Any field untouched by the application during the simulation of the particular input data is marked as a virtual field.

In another novel aspect of the field identification component 208, string input data values are identified by recognizing one of a small group of a consistent series of optimized instructions present when string input data is manipulated. The impact of this correction is not to overweigh a particular instruction because of its use in moving strings from one memory location to another.

The record identification component 210 identifies sequences of records belonging to the same data entity, such as an array. The novel algorithm used by the record identification component 210 to identify the sequences is based on the concept that applications tend to process a sequence of records in a loop construct. Based on this theory, the record identification component 210 first determines the locations of all of the loop constructs in the application binary image. Next the record identification component 210 determines the fields accessed by instructions within each loop construct. After completing the field to loop mapping, the record identification component 210 identifies the record boundaries of the sequences of records in the input data.

The first step of the record identification component 210 identifies all the loops in the execution trace. The record identification component 210 searches for cycles in the control flow graph. The control flow graph is simply a graphical representation of all possible paths through a program during its execution. This analysis yields a complete list of all the loops in the application binary image and their relationships. For example, this analysis would disclose relationships such as nested loops. The list of possible loops is filtered by considering only loops with a single entry point. The record identification component next maps the loop information to the execution trace to identify the loops in the execution trace. The record identification component 210 then uses the processors instruction pointer value to identify the list of all subsequences of the execution trace corresponding to execution of the loop. Finally, the loop iterations within the subsequences are identified by determining where the execution trace intersects the entry point of the loop.

The second step of the record identification component 210 identifies which fields accessed by the instructions of the loop constructs are specific to the iteration of that instruction. For example, if an instruction touches the same input data field on every iteration then the association between the instruction and the input data field is described as iteration independent. Alternatively, if an instruction touches a different input data field on every iteration then the association between the operand and the input data field is described as iteration dependent. The record identification component 210 uses iteration dependent associations to identify sequences of records.

The third step of the record identification component 210 groups the identified fields into records and indentifies the record boundaries. The identification algorithm assumes that a record is a contiguous sequence of fields and a record sequence is composed of contiguous records. Loops accessing fields outside of the currently processed record are acceptable but loops processing records not in the order the records appear in the input data are ignored. The algorithm is invoked for each identified loop containing iteration dependent instructions. The algorithm sets the start of the first record to the first field in terms of order in the input data accessed by iteration dependent instructions in the first iteration of the loop. Next, the algorithm identifies the set of iteration dependent instructions accessing the field at the beginning of the first record in the first iteration. The algorithm assumes that this set of instructions is likely to access the beginning of other records. Therefore the algorithm looks for these iteration dependent instructions from other iterations and sets the start of the corresponding record accordingly. The process is repeated for the case that an iteration does not use any iteration dependent instructions from this set. The end of a record is set to the byte preceding the start of the next identified record. Finally, the end of the last record is set to the last input byte accessed by any iteration dependent instructions in the last iteration. The following pseudo code represents this algorithm.

Find Record Boundaries(
1. IN n, // number of loop iterations
2. IN (l1, ..., ln), // iteration dependent instructions for each loop iteration
3. OUT (s1, ..., sn), // start offset of each record
4. OUT (e1, ..., en) ) // end offset of each record
5.
6. for ( j from 1 to n ) sj= −1; // mark start of record j as unknown
7.
8. for ( j from 1 to n ) {
9.    if ( sj= = −1 )
10.     then sj= min{ Offset( Field( inst ) ): inst 2 lj }
11.       l = { inst 2 lj: Offset( Field( inst ) )= Sj }
12.       for ( i from j + 1 to n )
13.         if ( l \ li 6= { } )
14.           si= min{ Offset( Field( inst ) ): inst 2 li \ l}
15. }
16.
17. for ( j from 1 to n − 1 ) ej= Sj+ 1 − 1;
18. en= max{ Offset( Field( inst ) )+ sizeof( Field( inst ) ): inst 2 ln}

Reconciliation of results across all loops is performed in one exemplary non-limiting embodiment. Consider two record sequences. Two sequences are denoted as equal, disjoint, overlap or that one sequence is contained in the other if positions in the input at which the two record sequences are located have the corresponding relations. Let A and B be two record sequences. If A and B are equal then treat A and B as the same sequence. If A is completely contained in a single record of B then one can consider A as a child record sequence of B. If A and B overlap in any other way, one can replace A and B by the following disjoint record sequences: C: the sequence that covers the interval on which A and B overlap; D: the part of A or B that precedes C (possibly empty); and E: the part of A or B that follows C. At the end of this step, all pairs or record sequences are either disjoint or in a parent-child relationship. This gives rise to the tree representation. This tree representation can be easily transformed into a BNF grammar that describes the input format. The Backus-Naur form (BNF) is a metasyntax used to express context-free grammars: that is, a formal way to describe formal languages. John Backus and Peter Naur developed a context free grammar to define the syntax of a programming language by using two sets of rules: i.e., Lexical rules and Syntactic rules. BNF is widely used as a notation for the grammars of computer programming languages, instruction sets and communication protocols, as well as a notation for representing parts of natural language grammars. Many textbooks for programming language theory and/or semantics document the programming language in BNF. There are many extensions of and variants on BNF.

The cutting of overlapping record sequences into smaller parts is motivated by the common pattern in string processing. The application first scans the entire string in search of keywords or delimiters, thus identifying substrings. After that, it processes the substrings. Length determination: outputted for each record sequence is how its length is determined. Consider the following three cases: (a) The length is determined by a termination record (cf. null terminated ASCII strings); (b) The length is determined by a separate length field; (c) The length is fixed an implicitly determined by the protocol specification.

The equivalent field identification component 212 identifies fields in the input data having the same semantics and the equivalence is not restricted to a single input data sample. For example, a record size field in one record of an input data file is equivalent to a record size field in another record of the same input data file or a record size field in a record of a different input data file. The basis of equivalence used by the subject invention is that if the same sequence of instructions from the application binary file operates on different fields then the fields are likely semantically equivalent. The equivalent field identification component 212 implements this novel concept by assigning a TerminalID to each field. The TerminalID is a compact signature representing the list of the opcodes that have operated on the subject field. After the analysis is complete the TerminalID for each field is compared and the fields with the same TerminalID are equivalent. The equivalent field identification component 212 recognizes sequences of instructions included in loops and assigns those sequences of opcodes to a TerminalID only if the sequence of opcodes operates on field input data in an iteration dependent fashion.

The grammar inference component 214 collects the output information provided by the field identification component 208, the record identification component 210 and the equivalent field identification component 212 and uses this information to generate the BNF-like grammar rules representing the automatically reverse engineered input format. The BNF-like grammar may be generated over a single input data such as a file input 206 for reverse engineering a file format specification or it may be generated over multiple inputs such as the requests and responses for an HTTP communication between a client and a server.

In one aspect, the novel grammar inference component 214 generates the grammar rules associated with a single input data in a bottom-up recursive fashion from the bottom up with respect to previously determined nested records. First, the grammar inference component 214 makes every field containing a TerminalID a unique terminal in the generated grammar. Next, the grammar inference component 214 constructs a data tree representing the record nesting hierarchy. The inference component 214 identifies records in a nested loop as children of the record corresponding to the iteration of the parent loop. The inference component 214 repeats this identification through as many nested levels as required based on the input data. A record can be identified as a child record, a parent record or a parent/child record depending on the record's location in the record nesting. Next, the inference component 214 generates a non-terminal for each leaf record by concatenating the terminals of all the fields in the leaf record. Next, the inference component 214 generates two non-terminals for each sequence of leaf records. One non-terminal is generated with an alteration rule and the other non-terminal is generated with a repetition rule. The repetition rule generated non-terminal represents the sequence of records and implies that the input allows a sequence of records represented by the non-terminal generated by the alteration rule.

In another aspect, the subject invention determines the record type for each identified record. Based on observations that applications typically have a separate handler function for each record type, the subject invention identifies records belonging to the same type if the loop iterations processing the records execute "mostly" the same instructions. A complicating factor is introduced when record sequences are nested. For example, when one or more records of a sequence contain other sequences then the instructions processing the sequence also depend on the embedded sequence, producing the appearance of an additional or different record type. Therefore the algorithm requires more than simply looking for similar instruction sequences.

The novel subject innovation addresses this added complexity by first defining l as an iteration dependent loop, r as the record sequences processed by the iteration dependent loop l and n as the number of records in record sequence r. Next, for $i \in \{1, \ldots, n\}$, the algorithm defines $Q_i$ as the subset of instructions from the set of iteration dependent instructions $I_i$ that access fields in the i-th record of r and compute the sets $Q_i$ for ever record sequence. The set $Q_i$ is a superset of the dependent instructions considered relevant to the analysis and therefore the algorithm next transforms the set $Q_i$ to $Q'_i$ of instructions representing the child loops.

The subject innovation computes $Q'_i$ by collapsing every segment of the instruction trace containing an execution of a child loop into a single virtual instruction and assigning the virtual instruction a virtual instruction pointer such that two virtual instructions have the same virtual instruction pointer if and only if they correspond to executions of the same loop. Finally, $Q'_i$ is set to $Q_i$ with the added restriction that all instructions in the child loop execution are replaced with the identifier of the virtual instruction representing the child loop. The effect of this transformation is that iteration dependent loops processing child record sequences contribute a single virtual instruction to the parent record sequence and eliminate differences based on what happened during the child loop sequence execution. The algorithm only wants to know if the child loop was executed and identifies two records i and j as having the same type if $Q'_i = Q'_j$.

In another aspect, the grammar inference component 214 generates grammar rules with a top-down approach. The grammar inference component 214 outputs identified fields and record sequences in the enhanced BNF format by generating a rule listing the top-level fields and record sequences in the order of their positions in the input data, referred to as the root rule. For each record sequence, the grammar inference component 214 generates an alternation rule to cover all the record types included in the record sequence. For each record type, the grammar inference component 214 generates a rule listing the fields and child record sequences for the record type. This algorithm is recursively continued for all of the record sequences and record types.

In another aspect, the grammar inference component 214 generalizes the single input data grammar rules by extending the analysis over multiple input data samples and providing a single format specification. The grammar inference component 214 accomplishes the task by matching fields, record sequences and record types across different execution traces of the same application binary image with different input data. First, grammar inference component 214 identifies matching fields from different execution traces if the fields are accessed by the same set of instructions in the different execution traces (or say with the same TerminalID). Similarly, grammar inference component 214 identifies matching records from different execution traces if the record sequences are processed by the same loops. Records from matching record sequences are identified as having the same type if the records contain the same nested child loops.

Next the grammar inference component 214 combines the grammar from the individual execution traces by identifying the pairs of grammar rules that can be merged based on root rules and the grammar rules of matched record sequences and record types. The first step is to align the list of fields and record sequences using a type-based sequence alignment technique. If all the fields and record sequences are matched then the two rules are identical and only one is included, otherwise, new alternation rules are created for each pair of unmatched fields or record sequences. Finally, a new rule is created listing matched fields and record sequences as well as the new alternation rules for the unmatched fields or record sequences.

The constraint identification component 216 identifies which locations of the input data are input values, constants hard-coded in the binary application or field length values. In one aspect of the subject invention symbolic predicates are identified that depend only on input values and constants in the binary program and are accordingly general to the input format. The constraint identification component determines if all leaf nodes in a data flow graph are either inputs or constants. For example, the immediate operands of the instructions in the binary program contain values hard-coded in the application representing checksums and hash values used to validate the integrity of the input data.

In another aspect, the constraint identification component 216 provides a novel algorithm that uses a database of symbolic predicates with known semantics. For example, the algorithm is aware that a particular system call returns the size of an input file in a known output parameter. The constraint identification component 216 algorithm will decorate the known output parameter with a special label and the label is propagated by the previously described data flow mechanics. The symbolic predicate leaf node search described above detects the presence of the special label and issues a known semantics constraint and label for use by the grammar inference component.

In another aspect, the constraint identification component 216 determines inter-message constraints for a multi-message network protocol. For example, the value of an input data field in a later message is based on the values of one or more input data fields in earlier messages such as session IDs and packet numbers. The constraint identification component 216 generates a symbolic predicate at the point the algorithm sends "tainted" input data. Specifically, the constraint identification component 216 generates an equality symbolic predicate based on the data flow graphs of the tainted data.

In another aspect, the constraint identification component 216 identifies the length fields in the input data that specify the length of a sequence in the input. The constraint identification component uses three techniques to identify length fields. The three techniques can be used independently or in combination with each other.

The first technique identifies a length field by detecting the use of an input field for constructing a pointer accessing another input data location. The constraint identification component 216 technique eliminates false identifications by requiring that the constructed pointer must be tainted by consecutive input bytes. The constraint identification component 216 associates the specified length to a field or record by comparing the adjusted value of the specified length with the length of each field or record between the specified length field and the destination input data. The first technique further determines if the specified length is for all fields and records between the specified length field and the input data by the specified length adjusted value with the length of all fields and records between the specified length field and the destination input data. The first technique then completes by adjusting the length value based on the data flow graph associated with the pointer. For example, a length field determined to be a length of four-byte elements will present an observation of the length field multiplied by four in the data flow graph.

The second technique relies on observations collected by the record identification component 210. The second technique identifies a length field by comparing the adjusted value of iteration independent instructions with the number of records identified by the loop, the length field is validated by equality to the number of records in the loop.

The third technique identifies length fields using information embedded in known call interfaces. For example, an input field used as the size argument to a "malloc" memory allocation call is identified as a length field. The third technique determines the portion of the input data written to allocated buffer to associate the length field with the proper location in the input data.

The grammar output component 218 collects the grammar generated by grammar inference component 214 and combines it with the constraints identified by the constraint identification component 216 creates the completed BNF-like grammar rules in a format usable by other tools such as a generic protocol analyzer or a network or system security application.

Figure 3:
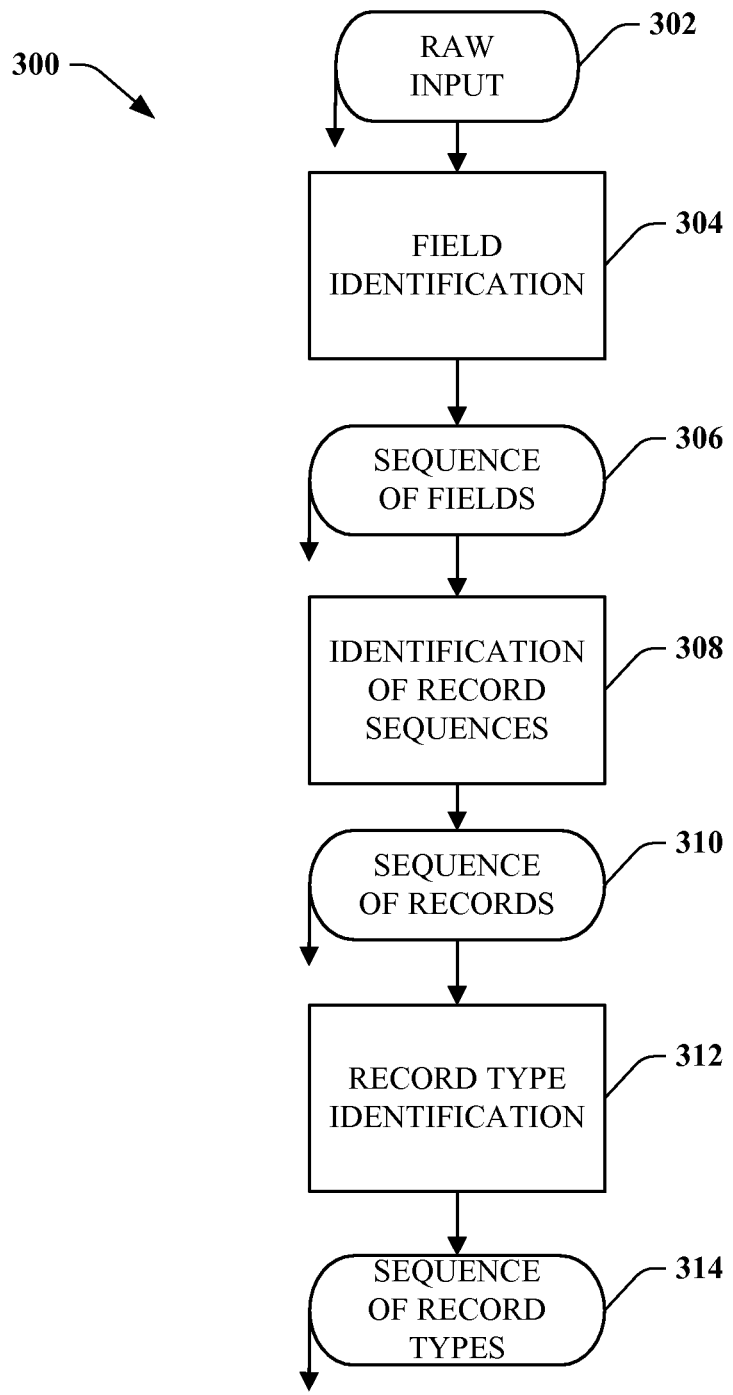
FIG. 3 illustrates the sequence of processing stages performed by one exemplary non-limiting embodiment.
Figure 4:
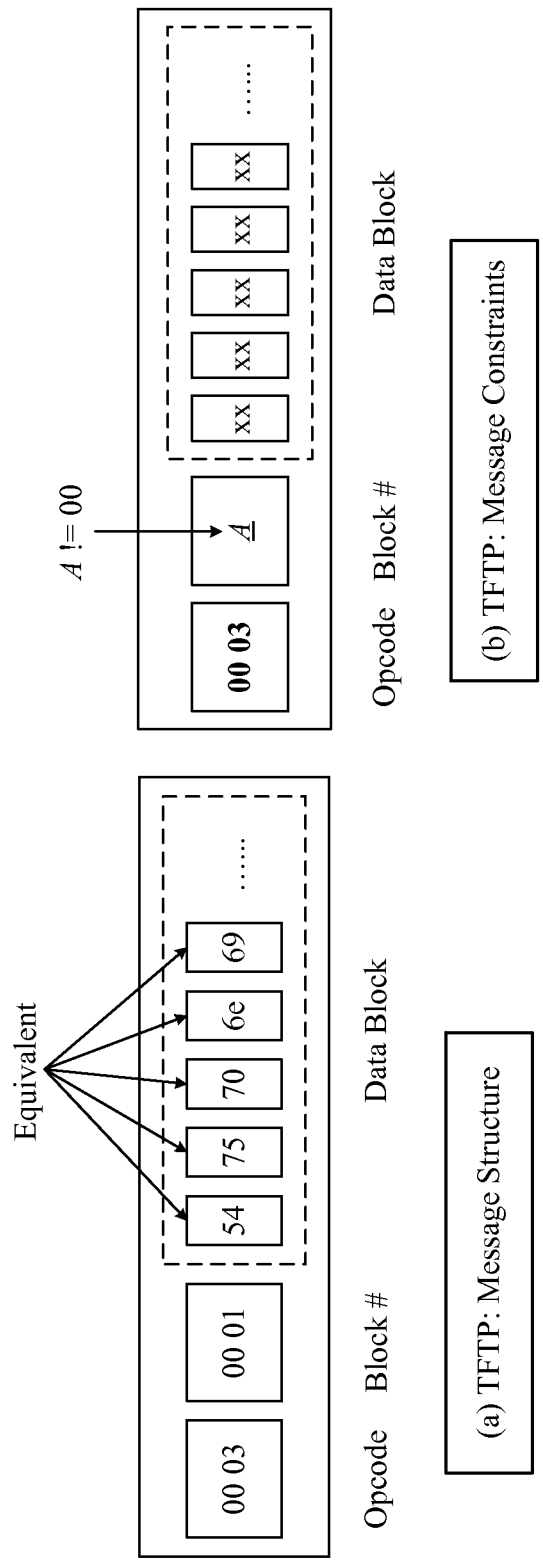
FIG. 4 illustrates one exemplary reverse engineered format of the TFTP data message.
Figure 5B:
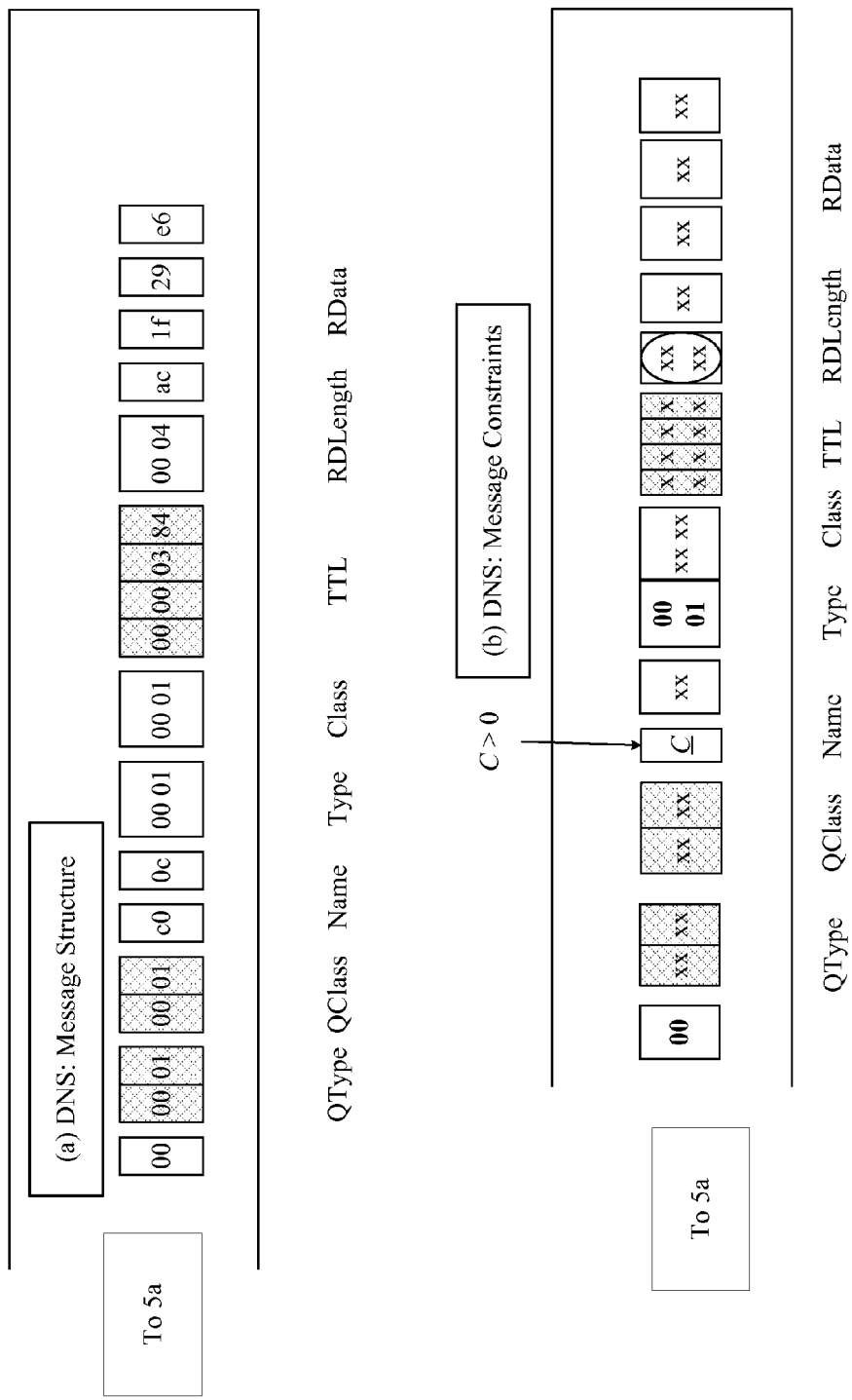
FIG. 5 (collectively FIGS. 5a and 5b) illustrates one exemplary reverse engineered format of the DNS response message.
Figure 6A:
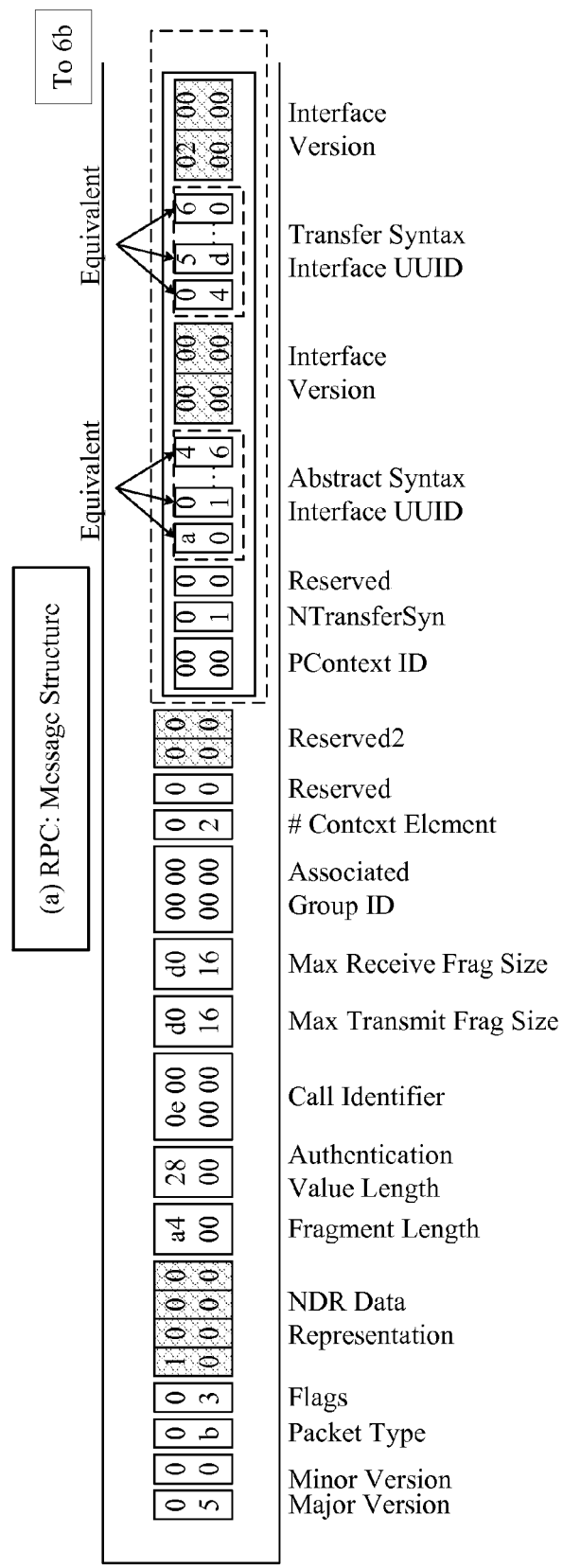
FIG. 6 (collectively FIGS. 6a, 6b, 6c, and 6d) illustrates one exemplary reverse engineered format of the RPC bind message format.
Figure 6C:
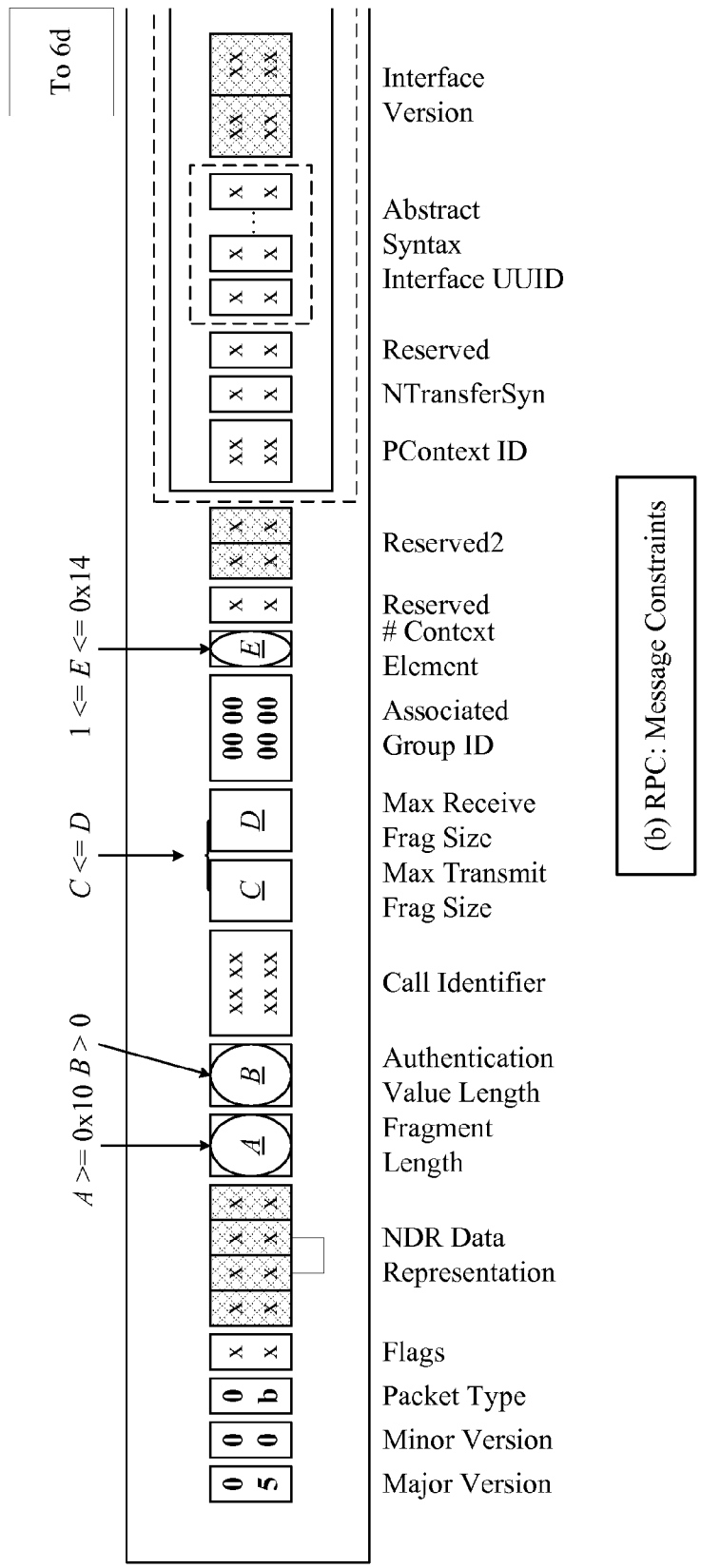
Figure 6D:
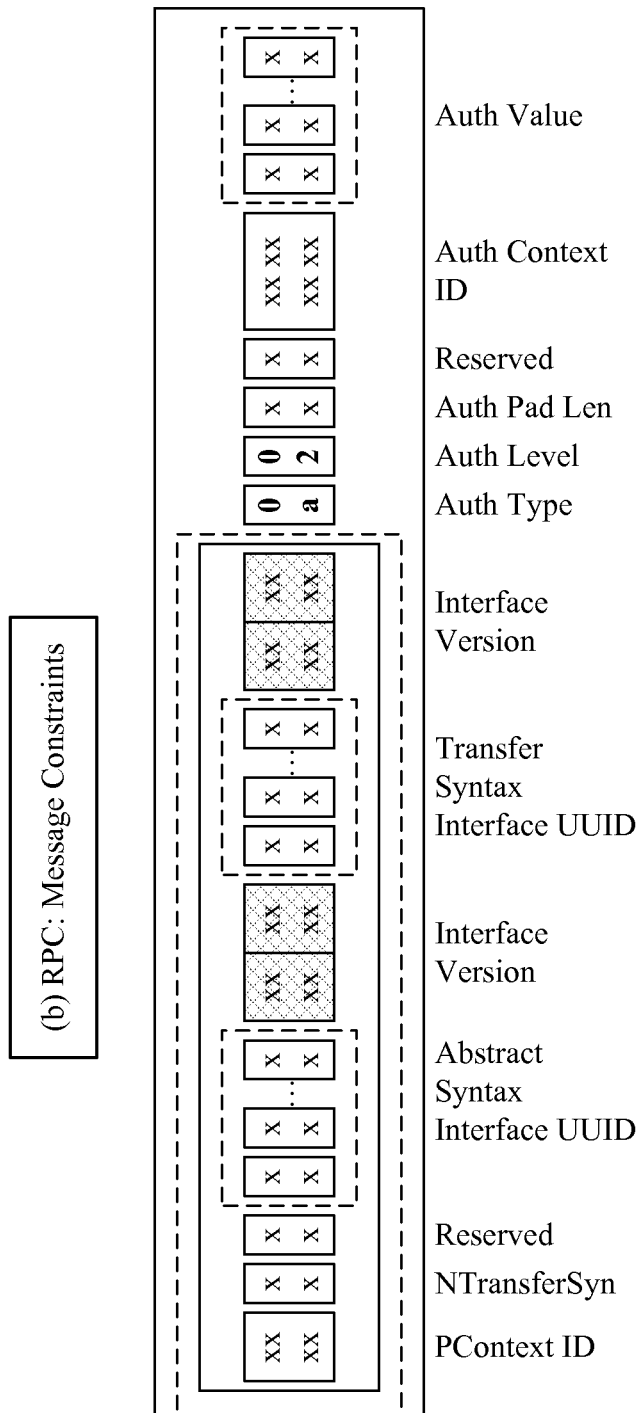
Figure 7:
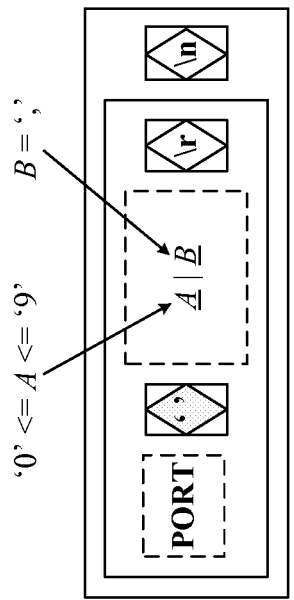
FIG. 7 illustrates one exemplary reverse engineered format of the FTP port message format.
Figure 7:
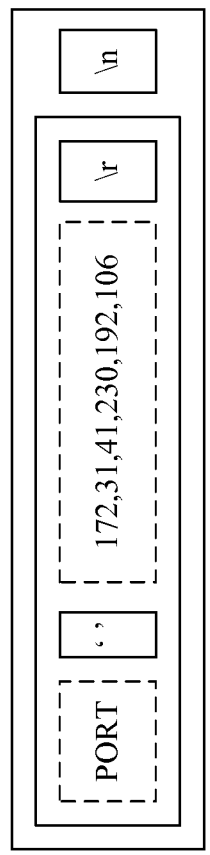
Figure 8A:
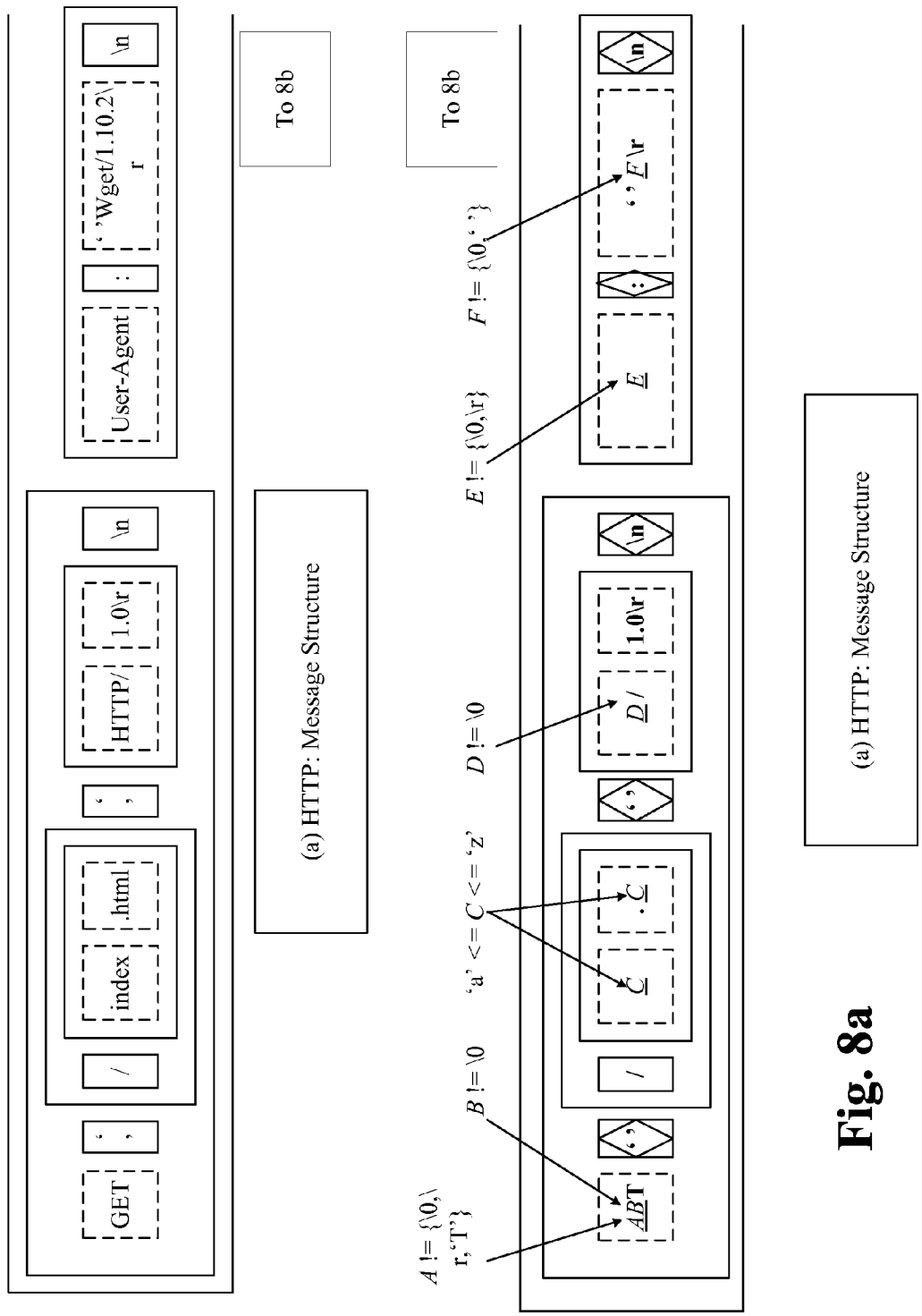
FIG. 8 (collectively FIGS. 8a and 8b) illustrates one exemplary reverse engineered format of the HTTP request message.
Figure 8B:
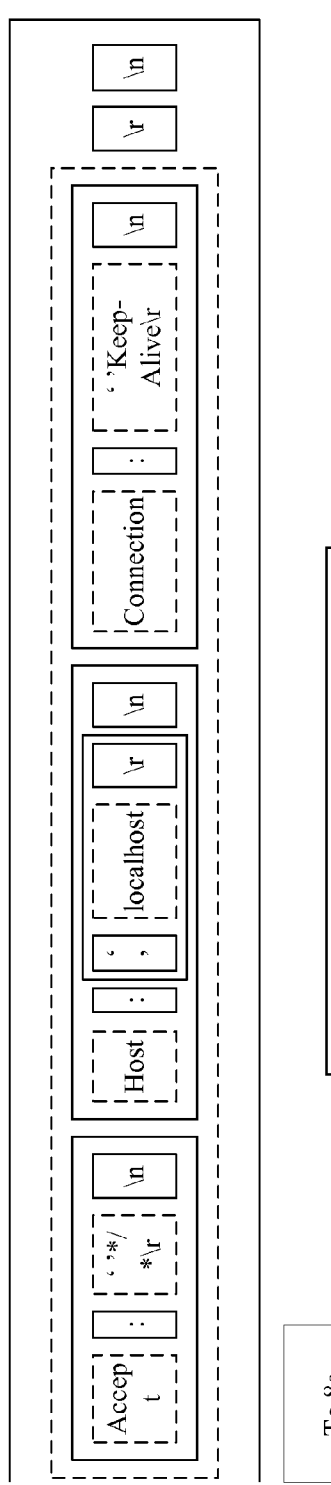
Figure 8B:
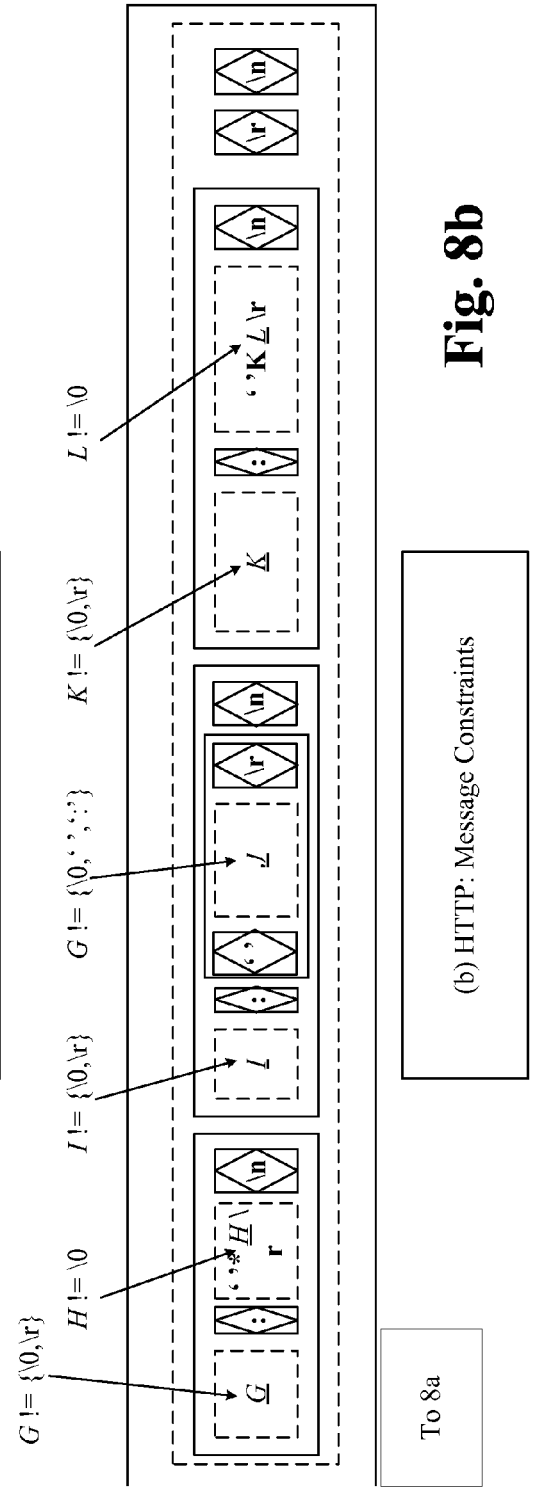
Figure 9A:
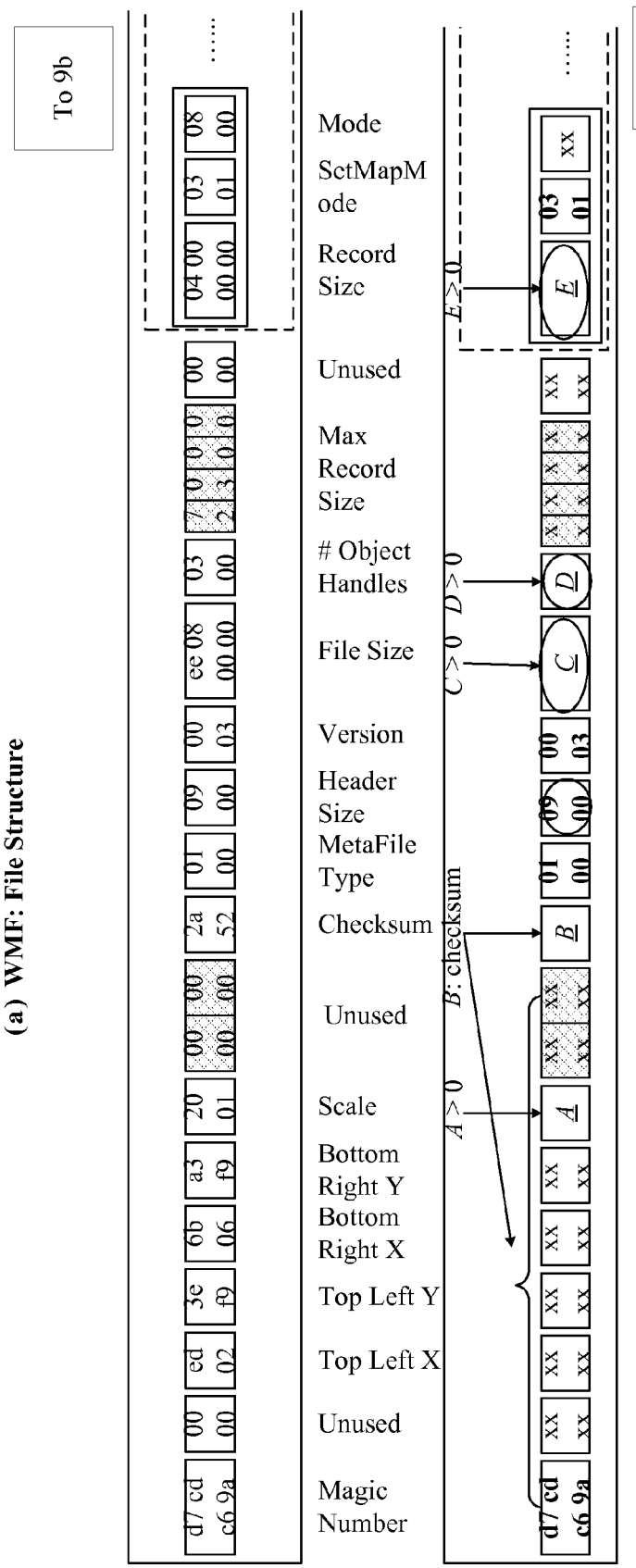
FIG. 9 (collectively FIGS. 9a and 9b) illustrates one exemplary reverse engineered format of the WMF (Windows Media File).

Referring to FIG. 3, the sequence 300 of processing stages performed by one exemplary non-limiting embodiment is depicted. A raw input 302 is first segmented into basic fields 304 producing a sequence of fields 306. The next processing stage identifies record sequences 308 producing a sequence of records at 310. Next, the records are classified into record types 312 identified in the input in the previous stage 302, thus generating a sequence of record types. A more complete list of the record types can be generated by repeating the analysis for several inputs.

Another exemplary non-limiting embodiment comprises a taint tracking engine. The taint tracking engine associates data structures with addresses in the application's address space and updates the data structures as the application executes. In one aspect, the data structures indicate whether the value stored at an address depends on input data. When input data arrives in the application's address space, the memory locations storing the input data are marked as tainted. Whenever an instruction reads and writes data, the data structure for the destination address is updated depending on whether any of the source operands are tainted.

More complex data structures, known as data flow graphs, allow more detailed information to be tracked, including which bytes in the input data the value at a tainted memory location depends on and how that value was computed. The algorithm now uses the heuristic that the instructions in I are likely to access the beginning of a record whenever they appear. Thus, it looks for instructions from I in each iteration (line 13) and sets the start of the corresponding record accordingly (line 14). The process is repeated (line 8) for the case that an iteration does not use any instruction from I. Finally, the end of each record is set to the position immediately before the start of the next record (line 17). The end of the least record is set to the last input byte accessed by any iteration dependent instruction in the last iteration (line 18). This procedure is performed for all iteration dependent loops. As above, a loop is ignored if the computed record start addresses are not increasing.

Knowledge of the semantics of platform specific functions such as system calls, application programming interface (API) functions and functions in runtime libraries can significantly enhance the accuracy and functionality of one exemplary non-limiting embodiment. As a preliminary step, one can add specifications of string processing functions and memory allocation functions to one exemplary non-limiting embodiment. These specifications are used in the following areas:

Field identification: Use of an input chunk as a function parameter can provide strong evidence that the chunk is a field. This evidence is incorporated into the field recognition step by increasing the weight w(c) of the chunk if one exemplary non-limiting embodiment sees a call to a known function in the execution trace.

Identification of record sequences: Functions can have record sequences (or pointers to them) as parameters. For example, a call to a standard string processing function with a character pointer that points to tainted data indicates the pointer marks the start of a string.

Constraint identification: function calls can provide information about different kinds of constraints. One can use knowledge of memory allocation functions to identify length fields. For example, a call to malloc with a tainted size parameter indicates this parameter is a length field.

In general, one may not consider the parts of the execution trace that are spent inside any of the known functions in the analysis. Effectively, this collapses calls to these functions into a single virtual instruction with special semantics.

FIGS. 4 through 9 represent examples of protocol message and file type input data streams determinable by the subject invention. These figures also illustrate the detectable constraints. The representative examples include a file transfer protocol session, a domain name server session, a remote procedure call message structure, a hypertext transfer protocol message structure and a Windows metafile structure.

Figure 10:
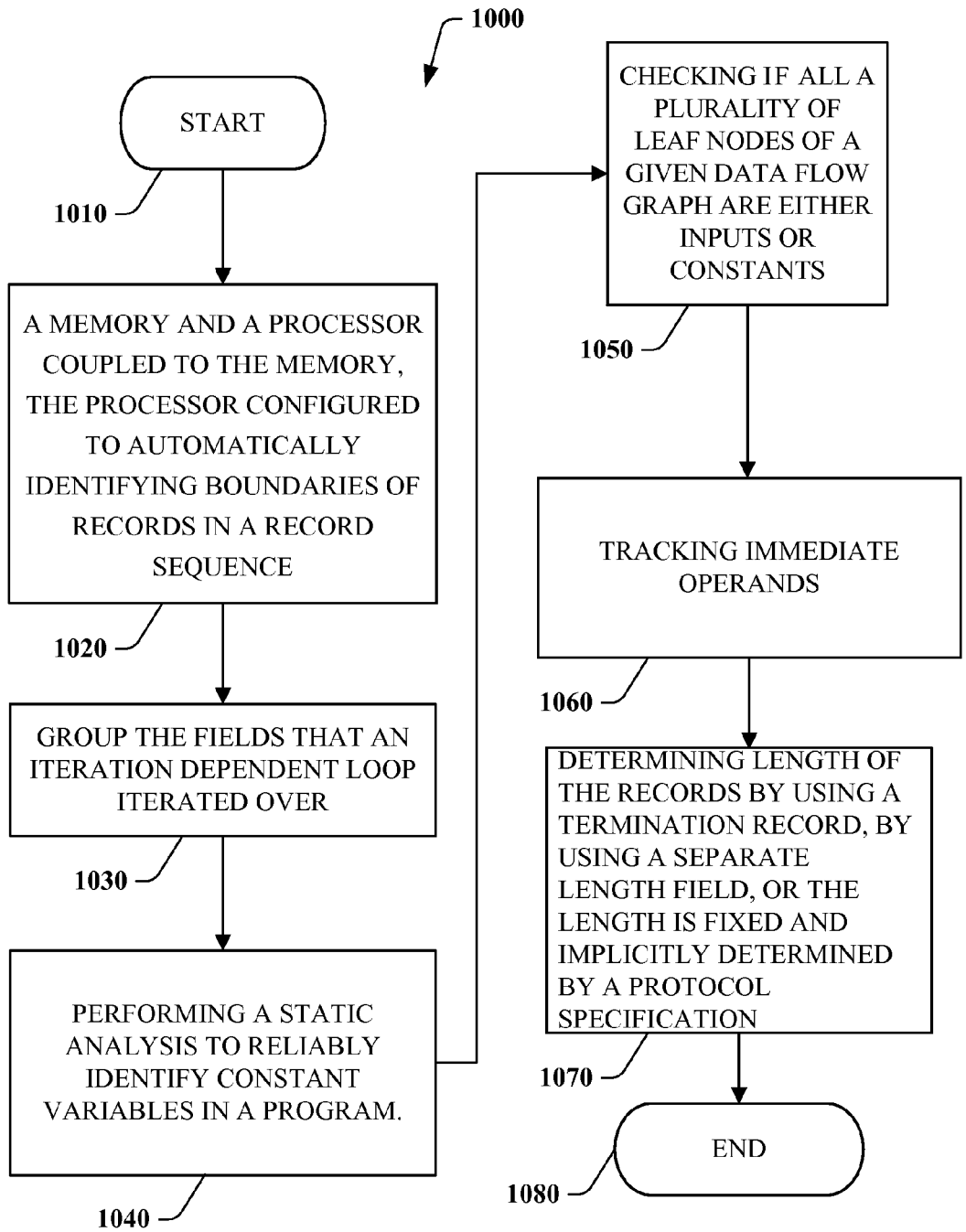
FIG. 10 is a flow diagram depicting a method that can be employed in conjunction with components disclosed or described herein.

FIG. 10 illustrates a workflow 1000 including a start block 1010 and a block 1020 where a memory and a processor is coupled to the memory, wherein the processor is configured to automatically identifying boundaries of records in a record sequence. At 1030 the processor is configured to group the fields that an iteration dependent loop iterated over. At 1040 the processor is configured to perform a static analysis to reliably identify constant variables in a program. At 1050 the processor is configured to check if all of a plurality of leaf nodes of a given data flow graph are either inputs or constants. At 1060 the processor is configured to track immediate operands. At 1070, the processor is configured to determine a length of the records by using a termination record, by using a separate length field, or the length is fixed an implicitly determined by a protocol specification. At 1080 is an end block.

Figure 11:
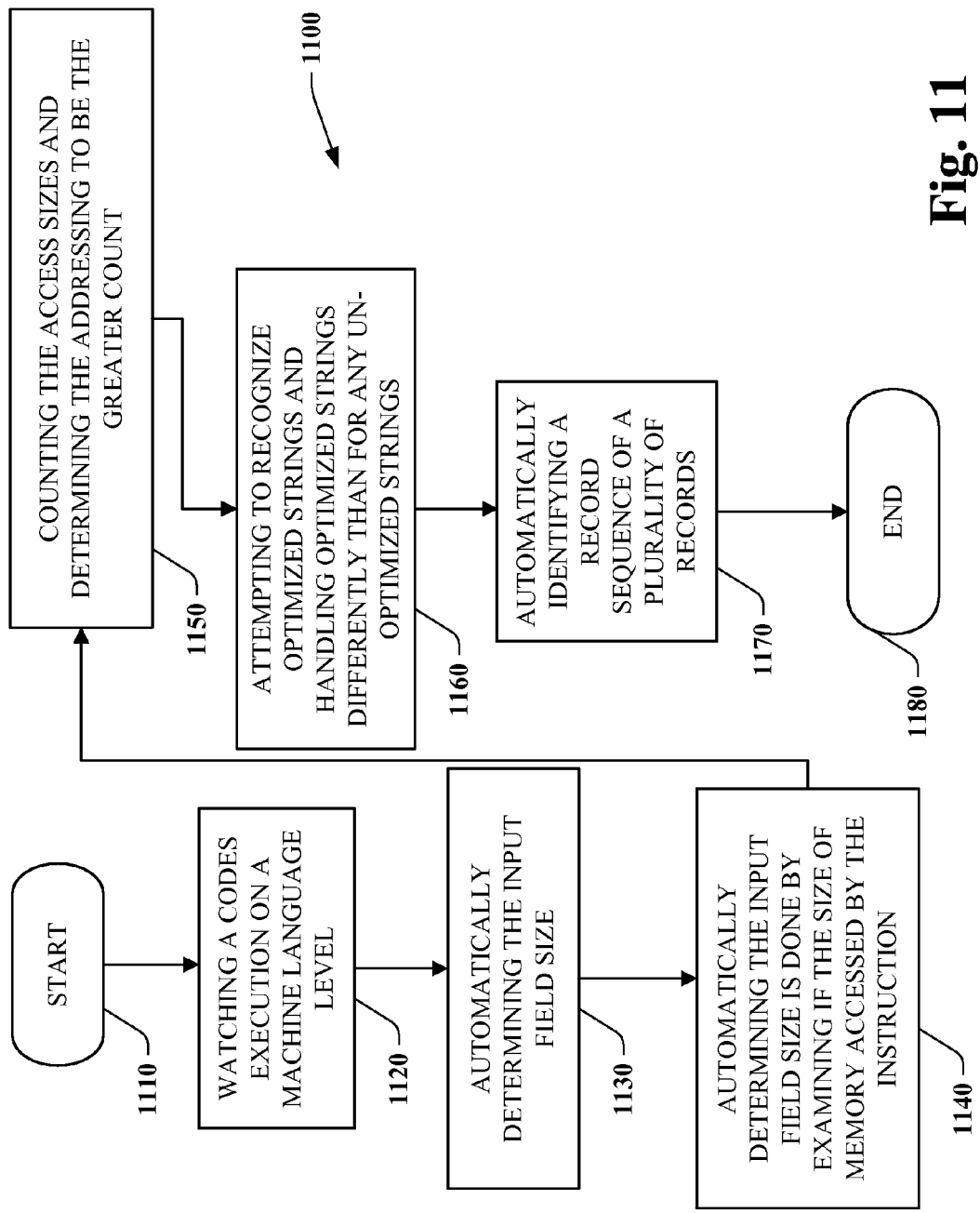
FIG. 11 is a flow diagram depicting a method that can be employed in conjunction with components disclosed or described herein.

FIG. 11 illustrates a workflow 1100 with a start block 1110. At 1120 is watching a codes execution on a machine language level and at 1130 is automatically determining the size of the memory accessed by the instruction. At 1140 is automatically determining the field size based on the size of the memory access. At 1150 is counting the memory accesses based on the memory size accessed. At 1160 is attempting to recognize optimized strings and handling optimized strings differently than for any un-optimized strings. Finally at 1170 is automatically identifying a record sequence of a plurality of records and at 1180 is an end block.

Any inference as described herein can be done by fully or partially utilizing an artificial intelligence (AI) layer or component. The AI layer or component can be employed to facilitate inferring and/or determining when, where or how to allocate fields, records, record sequences, constraints, etc. Such inference results in the construction of new events or actions from a set of observed events and/or stored event data, whether or not the events are correlated in close temporal proximity, and whether the events and data come from one or several event(s) and data source(s).

The AI component can also employ any of a variety of suitable AI-based schemes in connection with facilitating various aspects of the herein described innovation. Classification can employ a probabilistic and/or statistical-based analysis (e.g., factoring into the analysis utilities and costs) to prognose or infer an action that a user desires to be automatically performed. The AI layer can be used in conjunction with the security layer to infer changes in the data being transferred and make recommendations to the security layer as to what level of security to apply.

For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

The disclosed and described components, for example in connection with matching or inference tasks, can employ various artificial intelligence-based schemes for carrying out various aspects thereof. For example, inference or likely search terms or matching of topological maps or sets of demographic information, among other tasks, can be carried out by a neural network, an expert system, a rules-based processing component, or a support vector machine.

A classifier is a function that maps an input attribute vector, $X=(x_1, x_2, x_3, x_4, \ldots x_n)$, to a confidence that the input belongs to a class, that is, $f(X)=\text{confidence(class)}$. Such a classification can employ a probabilistic and/or statistical-based analysis (for example, factoring into the analysis utilities and costs) to prognose or infer an action that a user desires to be automatically performed. In the case of a page-biased search system, for example, attributes of a reference set of information to be used in a comparison can be used to determine whether a similar set can be considered to match the reference set.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, and probabilistic classification models providing different patterns of independence can be employed. Classification as used herein also includes statistical regression that is utilized to develop models of priority.

As will be readily appreciated from the subject specification, components disclosed or described herein can employ classifiers that are explicitly trained (for example, by a generic training data) as well as implicitly trained (for example, by observing user behavior, receiving extrinsic information). For example, SVMs are configured by a learning or training phase within a classifier constructor and feature selection module. Thus, the classifier(s) can be used to automatically perform a number of functions including but not limited to ranking search results.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

Figure 12:
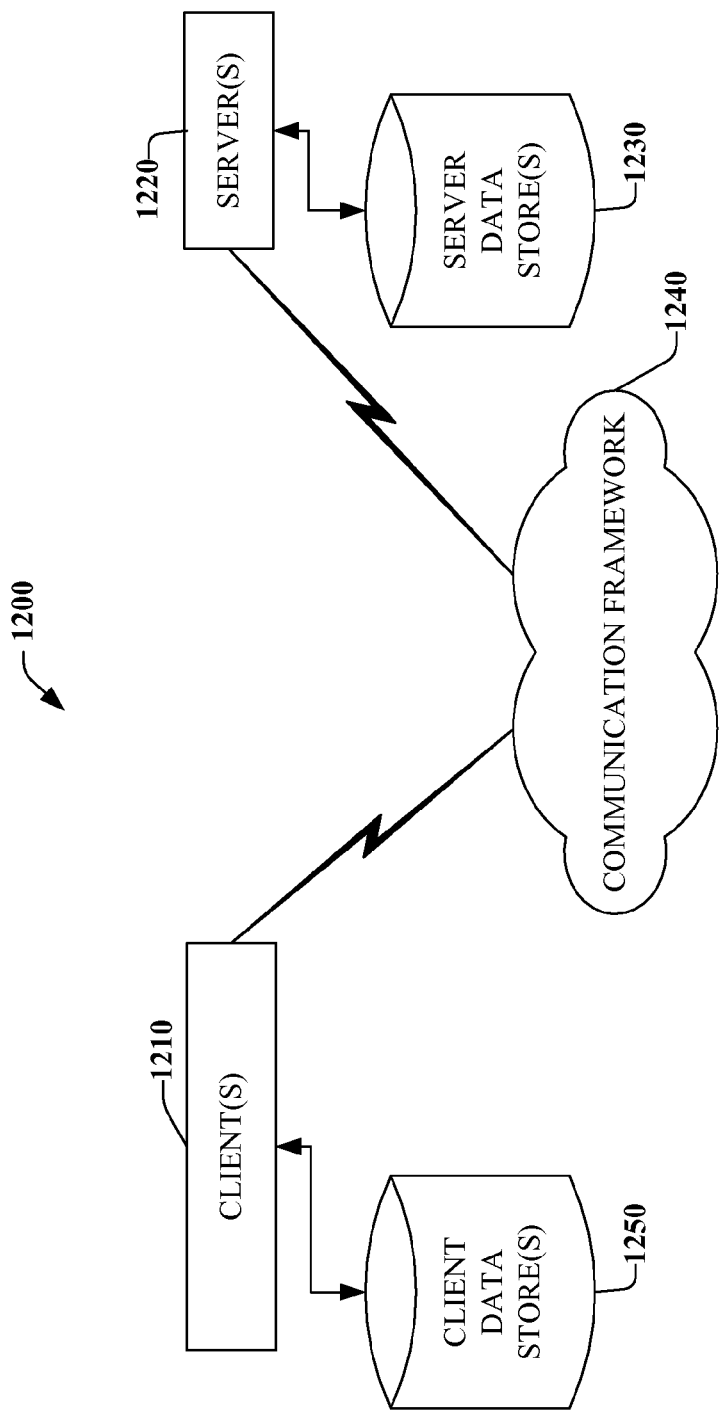
FIG. 12 illustrates an exemplary networking environment.

FIG. 12 is a schematic block diagram of a sample-computing environment 1200 within which the disclosed and described components and methods can be used. The system 1200 includes one or more client(s) 1210. The client(s) 1210 can be hardware and/or software (for example, threads, processes, computing devices). The system 1200 also includes one or more server(s) 1220. The server(s) 1220 can be hardware and/or software (for example, threads, processes, computing devices). The server(s) 1220 can house threads or processes to perform transformations by employing the disclosed and described components or methods, for example. Specifically, one component that can be implemented on the server 1220 is a security server. Additionally, various other disclosed and discussed components can be implemented on the server 1220.

One possible means of communication between a client 1210 and a server 1220 can be in the form of a data packet adapted to be transmitted between two or more computer processes. The system 1200 includes a communication framework 1240 that can be employed to facilitate communications between the client(s) 1210 and the server(s) 1220. The client(s) 1210 are operably connected to one or more client data store(s) 1250 that can be employed to store information local to the client(s) 1210. Similarly, the server(s) 1220 are operably connected to one or more server data store(s) 1230 that can be employed to store information local to the server(s) 1240.

Figure 13:
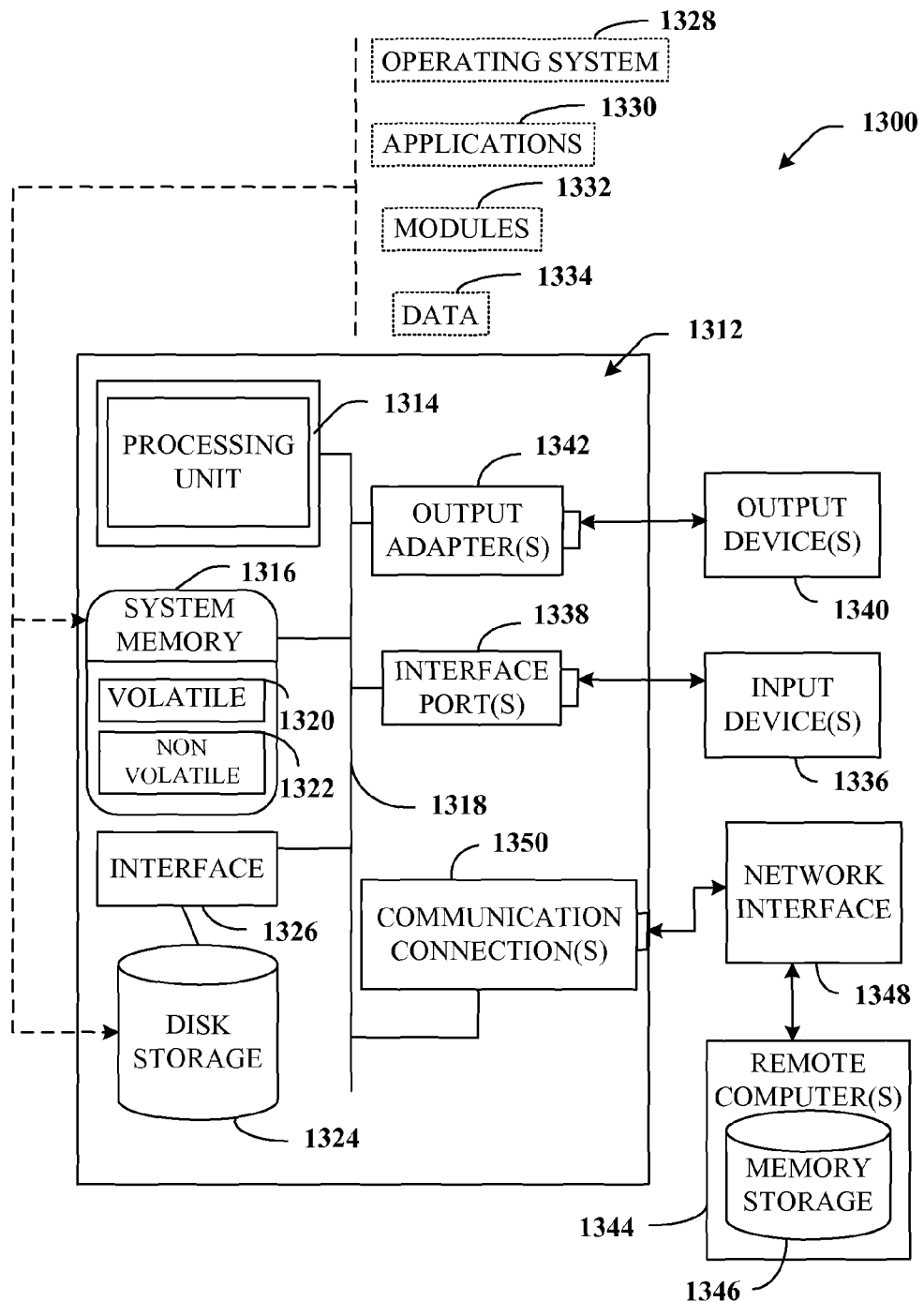
FIG. 13 illustrates an exemplary operating environment.

With reference to FIG. 13, an exemplary environment 1300 for implementing various components includes a computer 1312. The computer 1312 includes a processing unit 1314, a system memory 1316, and a system bus 1318. The system bus 1318 couples the system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Peripheral Component Interconnect Express (PCI Express), ExpressCard, Card Bus, Universal Serial Bus (USB), Advanced Graphics Port (AGP), Personal Computer Memory Card International Association bus (PCMCIA), Firewire (IEEE 1394), Serial Advanced Technology Attachment (SATA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. For example, FIG. 13 illustrates disk storage 1324. The disk storage 1324 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

The various types of volatile and non-volatile memory or storage provided with the computer 1312 can be used to store components of various implementations of the data port signaling system disclosed and described herein. For example, with reference to FIG. 3, the ranking module 310 can be implemented as a software module in the non-volatile memory 1322. At runtime, information the ranking module 310 can be loaded into the volatile memory 1320 from where machine-interpretable code can be accessed by the processing unit 1314 and thereby placed into execution.

It is to be appreciated that FIG. 13 describes software that acts as an intermediary between users and the basic computer resources described in the suitable operating environment 1300. Such software includes an operating system 1328. The operating system 1328, which can be stored on the disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the disclosed components and methods can be implemented with various operating systems or combinations of operating systems.

A user enters commands or information into the computer 1312 through input device(s) 1336. The input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. The interface ports 1338 specifically can include various data connection ports that can be used with components disclosed and described herein, among others.

Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wired and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes illustrative examples of certain components and methods. It is, of course, not possible to describe every conceivable combination of components or methodologies, but one of ordinary skill in the art will recognize that many further combinations and permutations are possible. Accordingly, all such alterations, modifications, and variations are intended to fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (for example, a functional equivalent), even though not structurally equivalent to the disclosed structure, which performs the function in the herein illustrated examples. In this regard, it will also be recognized that the disclosed and described components and methods can include a system as well as a computer-readable medium having computer-executable instructions for performing the acts and/or events of the various disclosed and described methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system comprising:
   machine-interpretable code configured to:
   select a binary program file for use in input data analysis,
   select an input data source having an input data format,
   simulate execution of the binary program file in combination with the input data source,
   analyze the simulated execution of the binary program file,
   identify multiple fields of the input data source using the simulated execution of the binary program file in combination with the input data source,
   determine sizes of individual fields of the input data source by applying a scoring algorithm to operand types used by the binary program file to operate on the input data source, wherein the scoring algorithm assigns at least three different score values to at least three different corresponding operand types, the at least three different score values including a first score value assigned to a first operand type, a second score value assigned to a second operand type, and a third score value assigned to a third operand type, and
   generate a grammar for the input data format of the input data source, the grammar identifying base types for the individual fields that are determined based on the sizes of the individual fields; and
   a hardware processor configured to execute the machine-interpretable code.

2. The system of claim 1, wherein:
   the first operand type is of a corresponding first size,
   the second operand type is of a corresponding second size that is different than the first size,
   the binary program file operates on a first individual field of the input data source using both the first operand type of the first size and the second operand type of the second size, and
   the scoring algorithm determines that the first individual field is of the first size instead of the second size based on the first score value and the second score value.

3. The system of claim 1, wherein:
   the binary program file operates on a first individual field of the input data source using both a comparison instruction that uses the first operand type and a memory move instruction that uses the second operand type, and
   the scoring algorithm determines that the first individual field is of a first size of the first operand type used by the comparison instruction instead of a second size of the second operand type used by the memory move instruction.

4. The system of claim 3, wherein the first size is greater than the second size.

5. The system of claim 1, wherein the grammar maps a first position of a first field in the input data source to a first base type having a first size of the first operand type.

6. The system of claim 5, wherein the grammar maps a second position of a second field in the input data source to a second base type having a second size of the second operand type that is different than the first size.

7. The system of claim 6, wherein the first size is 32 bits and the second size is 8 bits.

8. The system of claim 6, wherein the first size is 32 bits and the second size is 16 bits.

9. A computer-readable memory device or storage device encoded with machine-interpretable code that, when executed by a processing unit, causes the processing unit to perform acts comprising:
   selecting a binary program file for use in input data analysis;
   selecting an input data source having an input data format;
   simulating execution of the binary program file in combination with the input data source;
   analyzing the simulated execution of the binary program file;
   identifying multiple fields of the input data source using the simulated execution of the binary program file in combination with the input data source;
   determining sizes of individual fields of the input data source by applying a scoring algorithm to operand types used by the binary program file to operate on the input data source, wherein the scoring algorithm assigns at least three different score values to at least three different corresponding operand types, the at least three different score values including a first score value assigned to a first operand type, a second score value assigned to a second operand type, and a third score value assigned to a third operand type; and
   generating a grammar for the input data format of the input data source, the grammar identifying base types for the individual fields that are determined based on the sizes of the individual fields.

10. The computer-readable memory device or storage device of claim 9, the acts further comprising:
   identifying multiple first iteration dependent instructions of the binary program file that touch a first field of the input data source in first loops of the binary program file;
   identifying multiple second iteration dependent instructions of the binary program file that touch a second field of the input data source in second loops of the binary program file;
   assigning a first terminal in the grammar to the first field, wherein the first terminal assigned to the first field represents the multiple first iteration dependent instructions that touch the first field; and
   assigning a second terminal in the grammar to the second field, wherein the second terminal assigned to the second field represents the multiple second iteration dependent instructions that touch the second field,
   wherein the multiple first instructions are different than the multiple second instructions and the first terminal is different than the second terminal.

11. The computer-readable memory device or storage device of claim 9, the acts further comprising:
   simulating another execution of the binary program file in combination with another input data source;
   analyzing the another simulated execution and using the scoring algorithm to generate another grammar identifying other base types for the individual fields; and
   combining the grammar and the another grammar to create a combined grammar having an alternation rule that maps a position in the input data source to both an individual base type identified using the simulated execution and an individual other base type identified using the another simulated execution.

12. The computer-readable memory device or storage device of claim 9, the acts further comprising:
   determining that the input data format of the input data source comprises a checksum over a first field having a first number of bytes and a second field having a second number of bytes that is different than the first number of bytes.

13. The computer-readable memory device or storage device of claim 9, the acts further comprising:
   distinguishing between some loops of the binary program file that contain iteration dependent instructions and other loops of the binary program file that contain only iteration independent instructions; and
   performing record identification using the some of the loops of the binary program file that contain the iteration dependent instructions while not performing the record identification using the other loops of the binary program file that contain only the iteration independent instructions.

14. A method performed by at least one computer processing unit, the method comprising:
   selecting a binary program file for use in input data analysis;
   selecting an input data source having an input data format;
   simulating execution of the binary program file in combination with the input data source;
   analyzing the simulated execution of the binary program file;
   identifying multiple fields of the input data source using the simulated execution of the binary program file in combination with the input data source;
   determining sizes of individual fields of the input data source by applying a scoring algorithm to operand types used by the binary program file to operate on the input data source, wherein the scoring algorithm assigns at least three different score values to at least three different corresponding operand types, the at least three different score values including a first score value assigned to a first operand type, a second score value assigned to a second operand type, and a third score value assigned to a third operand type; and
   generating a grammar for the input data format of the input data source, the grammar identifying base types for the individual fields that are determined based on the sizes of the individual fields.

15. The method of claim 14, further comprising:
   representing a first field in the input data source with a first terminal in the grammar having a first signature corresponding to a first list of opcodes from the binary program file that operated on the first field; and
   representing a second field in the input data source with a second terminal in the grammar having a second signature corresponding to a second list of opcodes from the binary program file that operated on the second field, the second list of opcodes being different than the first list of opcodes.

16. The method of claim 15, further comprising:

identifying another field of the input data source that also has the first terminal assigned thereto in the grammar, wherein the another field is also operated on by the first list of opcodes in the simulated execution of the binary program file; and determining that the another field of the input data source is semantically equivalent to the first field of the input data source based on both the first field and the another field being assigned the first terminal in the grammar.

17. The method of claim 15, further comprising:

determining that the first field and a third field of the input data source are both part of a leaf record in the input data source;

assigning a third terminal in the grammar to the third field of the input data source; and generating a non-terminal for the grammar and assigning the non-terminal to the leaf record by concatenating the first terminal and the third terminal.

18. The method of claim 14, wherein the scoring algorithm assigns operands of certain comparison instructions the first score value, operands of function call instructions the second score value, operands of other comparison instructions the third score value, and operands of memory move instructions a fourth score value.

19. The method of claim 18, wherein the certain comparison instructions show an input value equal to some value and the other comparison instructions do not.

20. The method of claim 14, further comprising:

in an instance when a first field of the input data source is operated on by both a comparison instruction and a memory move instruction in the simulated execution, the grammar identifies a first base type for the first field having a corresponding first size for the comparison instruction instead of the memory move instruction.

* * * * *